United States Patent [19]

Ramsay et al.

[11] Patent Number: 5,502,576
[45] Date of Patent: Mar. 26, 1996

[54] METHOD AND APPARATUS FOR THE TRANSMISSION, STORAGE, AND RETRIEVAL OF DOCUMENTS IN AN ELECTRONIC DOMAIN

[75] Inventors: Thomas E. Ramsay, Minneapolis; James C. Elkins, Golden Valley, both of Minn.

[73] Assignee: Ramsay International Corporation, Minneapolis, Minn.

[21] Appl. No.: 933,623

[22] Filed: Aug. 24, 1992

[51] Int. Cl.⁶ .............................. H04N 1/40; H04N 1/00
[52] U.S. Cl. ......................... 358/444; 358/403; 358/404
[58] Field of Search ................................. 358/401, 403, 358/404, 443, 444, 462, 467; 345/2

[56] References Cited

U.S. PATENT DOCUMENTS

| 2,072,527 | 3/1937 | Nicolson | 369/275.1 |
| 2,540,105 | 2/1951 | Dunbar et al. | 369/275.1 |
| 2,588,680 | 3/1952 | Williams | 369/18 |
| 3,810,174 | 5/1974 | Heard et al. | 342/185 |
| 3,964,064 | 6/1976 | Brandao et al. | 342/185 |

(List continued on next page.)

FOREIGN PATENT DOCUMENTS

| 0007655 | 7/1907 | European Pat. Off. | G11B 7/00 |
| 0122094 | 3/1984 | European Pat. Off. | H04N 5/76 |
| WO90/04837 | 10/1989 | WIPO | G08K 9/30 |

OTHER PUBLICATIONS

Four page brochure from Folsom Research on Video/Scan and CGCII.
Fourteen pages of brochures from RGB Spectrum.
Six page brochure from RGB Spectrum entitled *Videographics Report*.
Excerpt from *New Media* Magazine, Aug. 1992, pp. 1, 14–17.
Excerpt from *New Media* Magazine, Sep. 1992, pp. 1, 24–27.
Excerpt from *MacWorld* Magazine, Aug. 1992, 3 pages.
Excerpt from *New Media* Magazine, May, 1992, pp. 12–16.
Excerpt from *ABA Journal*, Sep. 1992, 2 pages.
Technology 2001, The Future of Computing and Communications, Leebaert, Derek; Chapters 7–9.

(List continued on next page.)

Primary Examiner—Scott A. Rogers
Assistant Examiner—Jerome Grant
Attorney, Agent, or Firm—Briggs and Morgan

[57] ABSTRACT

A method and apparatus for high speed conversion of tangible source documents to electronic images, and subsequent transmission or storage and retrieval of images, utilizing hybrid signal processing. The system employs a higher bandwidth analog signal for image capture and lower effective bandwidth analog signal for transmission or storage and retrieval, with an intervening digital memory utilized to construct a bitmap of the image to facilitate various dissection and seaming schemes which optimize image content and processing time. The system is designed around a conventional bus structure, and the memory serves as a junction with conventional personal computers, networks, and peripheral devices. In a representative embodiment, a tangible image is captured using a camera producing an analog signal with conventional raster synchronization. The synchronization is stripped from the analog signal, which is digitized for 8-bit grayscale and multiplexed to the memory where the image exists as a bitmap that may be divided into segments. The content is read from the memory, converted to an analog signal, and control signals are added. The control signals include horizontal and vertical sync pulses and interval blanking, a pilot signal to maintain alignment between adjacent segments along seams and to compensate for time-based errors, and calibration pulses to permit instantaneous adjustment of the gray level for each line, ensure accurate image content, and permit display enhancement. The resultant analog signal is stored on a randomly accessible storage medium as one or more frames, transmitted and reassembled, or displayed on a conventional monitor.

51 Claims, 6 Drawing Sheets

U.S. PATENT DOCUMENTS

| | | | |
|---|---|---|---|
| 3,999,008 | 12/1976 | Bouwhuis et al. | 358/128 |
| 4,023,185 | 5/1977 | Bloom et al. | 369/275.1 |
| 4,097,895 | 6/1978 | Spong | 369/275.1 |
| 4,118,734 | 10/1978 | Bouwhuis et al. | 369/111 |
| 4,128,838 | 12/1978 | Brands et al. | 342/185 |
| 4,161,752 | 7/1979 | Basilico | 358/128 |
| 4,172,386 | 10/1979 | Cribbs et al. | 73/618 |
| 4,204,433 | 5/1980 | Cribbs et al. | 73/618 |
| 4,232,376 | 11/1980 | Dion et al. | 365/222 |
| 4,236,221 | 11/1980 | Cribbs et al. | 348/163 |
| 4,275,425 | 6/1981 | Engle | 360/92 |
| 4,313,188 | 1/1982 | Bartolini et al. | 369/109 |
| 4,315,269 | 2/1982 | Bloom et al. | 346/145.1 |
| 4,378,571 | 3/1983 | Handy | 358/446 |
| 4,463,380 | 7/1984 | Hooks, Jr. | 348/580 |
| 4,568,941 | 2/1986 | Thomas et al. | 342/185 |
| 4,688,203 | 8/1987 | Koishi et al. | 369/148 |
| 4,745,475 | 5/1988 | Bicknell | 348/442 |
| 4,754,279 | 6/1988 | Cribbs | 342/185 |
| 4,833,475 | 5/1989 | Pease et al. | 342/185 |
| 4,837,579 | 6/1989 | Pease et al. | 342/197 |
| 4,845,501 | 7/1989 | Pease et al. | 342/185 |
| 4,868,653 | 9/1989 | Golin et al. | 358/133 |
| 4,899,220 | 2/1990 | Bazile | 348/584 |
| 5,006,936 | 4/1991 | Hooks, Jr. | 358/335 |
| 5,036,326 | 7/1991 | Andrieu et al. | 342/176 |
| 5,049,886 | 9/1991 | Seitz et al. | 342/26 |
| 5,051,734 | 9/1991 | Lake, Jr. | 340/700 |
| 5,111,306 | 5/1992 | Kanno et al. | 358/403 |
| 5,126,747 | 6/1992 | Ren et al. | 342/185 |
| 5,276,866 | 1/1994 | Paolini | 358/143 |

OTHER PUBLICATIONS

Service Manual for LVR–5000A, Sony Corp., p. 1.

Service Manual for LVS–5000A, Sony Corp., p. 1.

Service Manual for TQ–3032F, Panasonic, p. 1.

Andrew Cannon, Storage and Management of Still Pictures and Electronic Graphics Published in Image Technology (Journal of the BKSTS), 72 (1990) Jun., No. 6, London, GB.

H. M. Morris and R. H. Orth, Image System Communications Published in IBM Systems Journal, 29(1990)No. 3, Armonk, N.Y., US.

K. Mun Seong and L. T. C. Fred Goeringer, An Image Management and Communications (IMAC) System for Radiology Published in Medical Progress through Technology, 18(1992)No. 3, Dordrecht, NL.

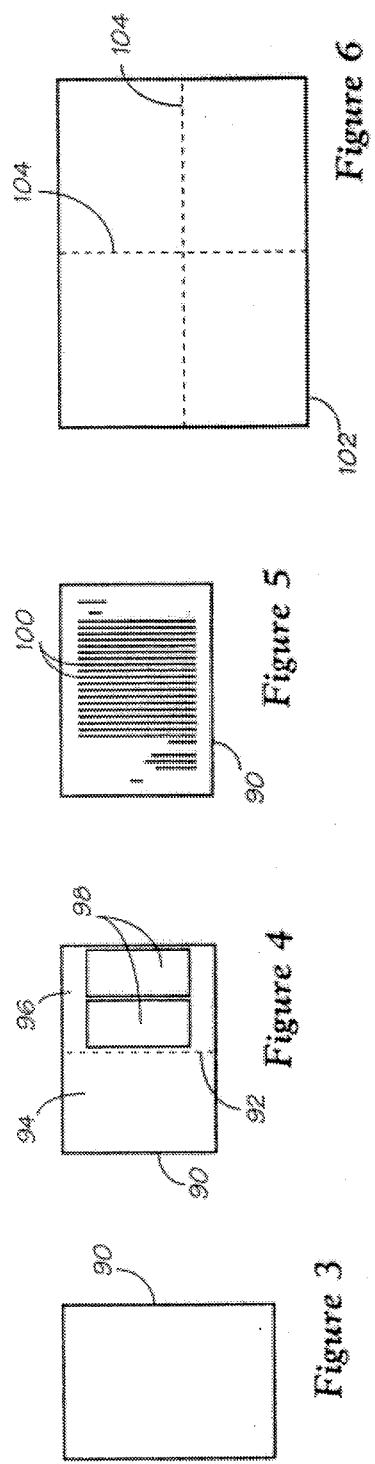
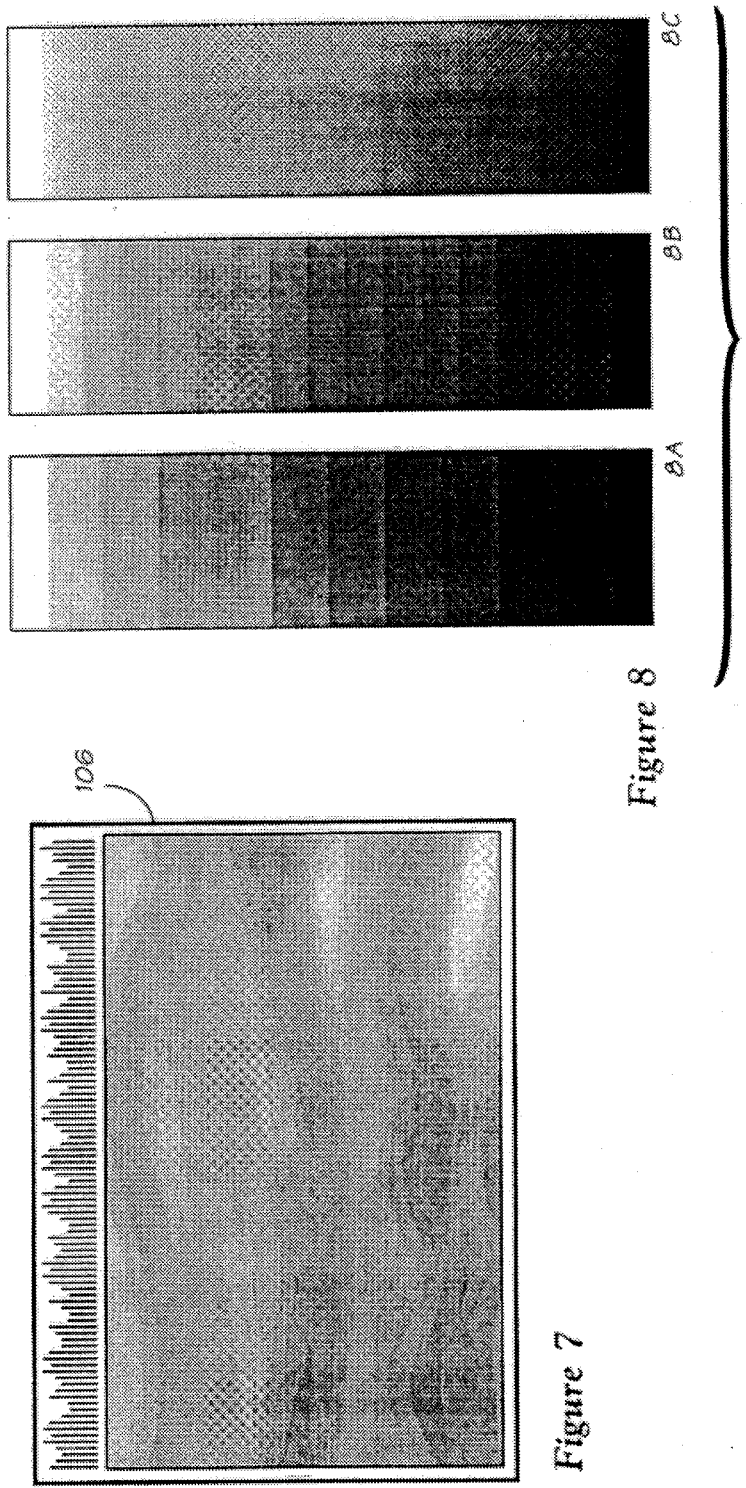

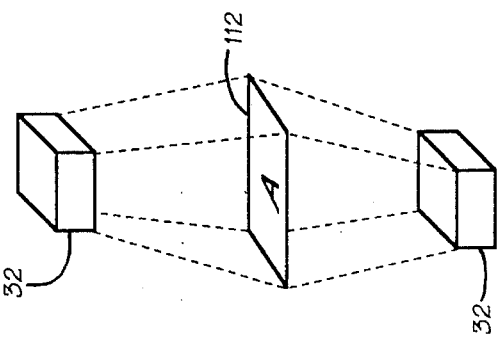
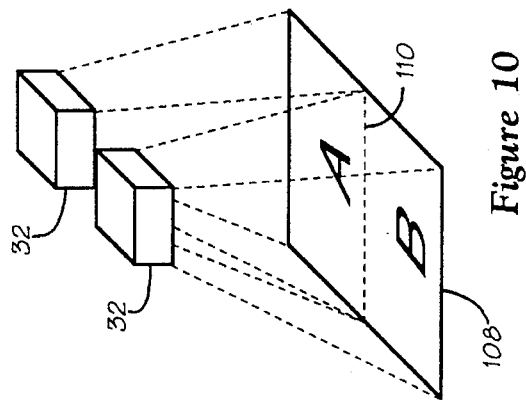
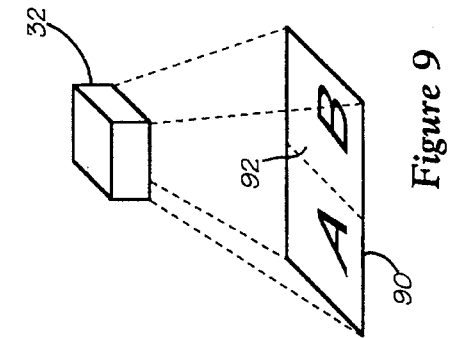
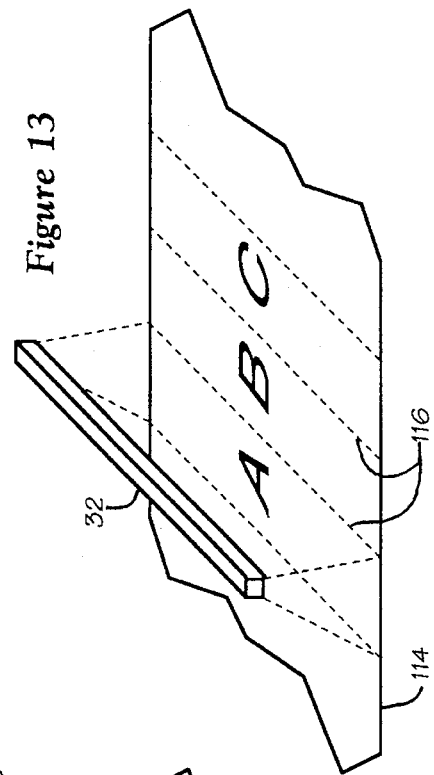
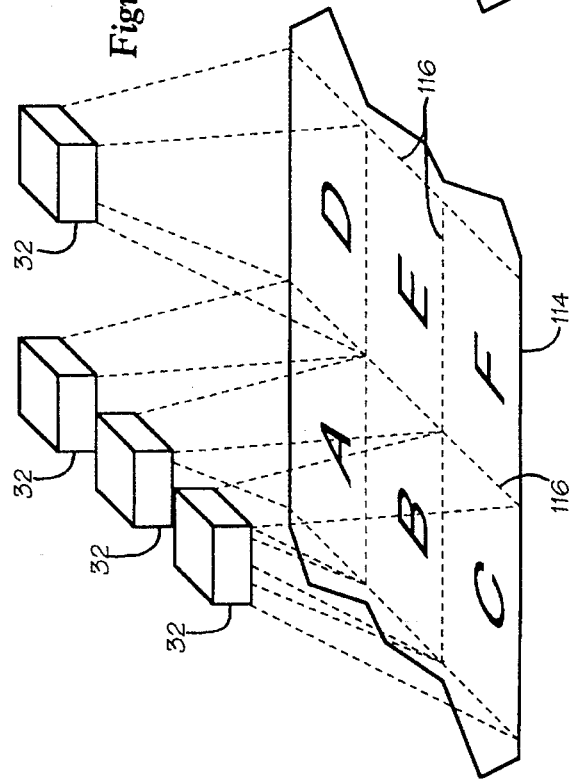

METHOD AND APPARATUS FOR THE TRANSMISSION, STORAGE, AND RETRIEVAL OF DOCUMENTS IN AN ELECTRONIC DOMAIN

BACKGROUND OF THE INVENTION

1. Field of the Invention

This invention relates generally to interactive document processing in an electronic domain, and particularly to a new modality incorporating hybrid (digital and analog) signal processing for the transmission, storage, and retrieval of documents to optimize informational content and processing time.

2. General Terminology

While the terminology utilized in the detailed description of the preferred embodiments is basic to those of ordinary skill in the art relating to designing equipment of the types discussed herein (i.e., television cameras, optical laser disc recorders, personal computer interfaces, local area networks, data transmission systems), the general terminology relating to interactive document processing operations is uncertain. A clear and uniform delineation of this terminology is therefore considered necessary to a proper understanding of the subject matter of this invention.

A document is any information recorded in a substantial (tangible) or insubstantial (electronic) form structured for human visual comprehension either directly or through the aid of enabling equipment. Documents were at one time considered written or tangible information, and this definition was later broadened to information fixed in any tangible medium such as magnetic tapes or optical disks. Currently, it is necessary to view documents even more broadly, since they may be created and reside exclusively in electronic memory, and may be transformed, presented, or transmitted without ever being reduced to a tangible medium.

Documents are therefore one subset of all the types of informational bundles, with non-documents generally being referred to simply as recordings. Documents and recordings may coexist in the same tangible medium, such as a magnetic video tape having both an audio recording coupled with a sequence of visual frames, or they may exist in related or completely separate and distinct mediums.

The differentiating requirement imposed upon documents is that they be capable of direct or assisted visual comprehension. For example, a page written in braille is normally structured for both visual and tactile comprehension. The fact that it is intended for tactile comprehension does not defeat the fact that it is also structured for visual comprehension. (In this instance, comprehension does not imply recognition or interpretation of the braille characters or their assigned meanings, but merely acknowledgement or appreciation of their existence as having content and structured form in the document which may be visually observed.) Several types of informational bundles that are structured for comprehension only by senses other than visual or auditory do exist or have been postulated, but no uniform or concise body of terminology has been developed to classify or categorize their nature or properties. Furthermore, only recordings and documents have developed as recognized means for information processing and interpersonal communication.

It may be appreciated that where documents are integrated with recordings, the term "recordings" has been adopted as the descriptive or identifying name for both components of the informational bundle predominantly because of the particular nature of the existing technologies and mediums currently employed on a standardized basis. It remains to be seen whether this tendency will change with the proliferation of multimedia processing (that is, processing both documents and recordings in an electronic domain as integrated but separable components of an unitary informational bundle.)

Although documents existed and were used for interpersonal communication long before recordings, the technological improvements in recording over the last century have so overshadowed the improvements in processing tangible documents that the basic recording technologies were applied extensively and uniformly to both tangible and electronic documents. The current methods utilized for processing both substantial and insubstantial documents have therefore remained conceptually static since the introduction of electronic documents, due in large part to the limiting effect caused by the recent revolution in semiconductor memory and the correspondingly complete acceptance of a digital standard controlling both quantitative and qualitative precision for all insubstantial documents.

A document may exist within any one of three domains: tangible (paper, microfilm or fiche, photographic negatives or prints, etc.); electronic image (two dimensional bitmaps or arrays consisting of rows and columns of pixels each having a particular informational depth describing a monochromatic, grayscale, or color value); and electronic content (alphanumeric data strings, formatted text, spreadsheets, machine-readable programs, etc.)

There have traditionally been considered six basic operations that may be performed in association with a document: creation, reproduction, transformation, display, communication, and storage and retrieval. These operations may be performed on any document regardless of the domain in which it resides. The commonly accepted definitions for each these operations were distilled and articulated concurrently with the development of the existing technologies for converting tangible documents to electronic images, and for converting portions of electronic images to electronic content.

As may be seen by the following discussion, recent developments in the field of document processing (and particularly the technology disclosed in this application) necessitate expanding this list and refining the definitions of those operations. An appreciation of the interrelationships among and distinctions between these operations and their intended definitions is therefore a prerequisite to understanding the modality disclosed herein.

The definitions of "creation" and "reproduction" as used herein differ only slightly from the traditional protocol.

Creation is the initial authoring and fixing of a document in a specific medium. Creation can then be said to comprise the interrelated steps of composition and recordation in which the document is given content and form, both of which may be dependent on human perception and physical limitations of the medium.

Reproduction is the recording of a document's current content and form on multiple instances of the document's current medium.

At this point it is necessary to diverge more significantly from the existing protocol to interpose distinct and broader operational terms. As discussed subsequently in greater detail, current technology has produced expectations regarding operational precision in document processing that have focussed principally on the qualitative precision in reproduction of tangible documents and electronic images and the quantitative precision in transmission, storage, and retrieval of electronic content. These expectations are no longer valid, particularly when discussing the qualitative precision associated with document processing in the electronic image domain, and to be accurate the terms must therefore reflect the fact that certain processes affect either the content or form of a document to the degree that those processes must be reclassified as different operations.

For example, photocopying has traditionally been thought of as reproduction since it is the production of a "duplicate" of an original image on a similar tangible medium. This duplicate image retains sufficient qualitative precision in both content and form that it may be utilized for interpersonal communication in place of the original for many legal or business practices. However, current black-and-white and color photocopying processes result in the loss of such a substantial amount of information in some situations that it constitutes a transformation or material alteration in the basic content of the original document compared with the levels of qualitative precision established by the technology disclosed herein.

As such, for purposes of this discussion photocopying is actually the creation of a distinct derivative document based upon the form and content of the original. In some instances, due to the nature of the original document and the photocopying technique employed, the derivative document will retain sufficient information and qualitative precision to constitute a reproduction. However, a photocopy will not in all cases be a reproduction.

Representation is the recording of a document's current content and form on a different or distinct medium, or recording a portion of the current content and form on the same or different medium, which results in a change in the informational composition of the document. Representation may therefore be thought of as involving some intermediate transition in the domain, content, or form of a document. Representation will frequently entail the transition between two domains, such as the printing of an electronic image on a tangible medium or rendering the image as electronic content, but as with reproduction the original document may continue to exist and reside in the same domain.

Because documents are more frequently being created in the electronic image and electronic content domains, it is important to remember that many people incorrectly regard the initial tangible representation of a document as the original. Those representations are in fact only derivative documents which do not possess the same informational composition as the original, and many representations of an original document result in transitions or transformations that are unintentional from the viewpoint of the operator, but which are intentional and necessary from the viewpoint of the designer of the technology being utilized to produce the representation.

Thus, any intermediate transition between domains or mediums is assumed to encompass some form of a representation, unless the particular nature and character of the original document and the processes used for the transition are sufficiently precise and compatible for the representation to be considered a reproduction for the given functional purposes being considered.

Transformation is the change in content, form, medium, or domain of a document that produces a new or derivative version which is itself a unique document. Transformation can easily be thought of as the creation of a new document, and conversely the process of creation can be thought of as a series of transformations eventually resulting in a document having a desired informational content or form within a specified medium. In some cases (such as manipulating an electronic image contained in semiconductor memory) the original document ceases to exist and is replaced by the new or derivative document. It should also be remembered that other operations such as representation may inherently produce or require transformations due either to the technology employed or the limitations imposed by transitions between mediums or domains, and those transformations and manipulations are frequently transparent to or not appreciated by the operator. As with representation, transformation involves some intentional transition in the document invoked by the operator or the technology designer. The term manipulation is therefore regarded as being more appropriate to describe transformations that are consciously made, selected, instructed, or invoked directly by the operator to intentionally affect the content or form of the document in a predetermined manner.

Transformation has traditionally included some processes involving a change in medium or domain, however since we must assume for definitional purposes that a transition to a new medium or domain may have a substantial and often deleterious affect on the actual informational content of a document, any process involving the transition between mediums or domains are also necessarily regarded as a transformation that gives rise to either a representation of the document or the creation of a new document.

Presentation is the visual manifestation of a selected portion of the content and form of a document for human comprehension. Presentation would include processes such as displaying an electronic image as a rasterized image on a cathode-ray tube (CRT), as a bitmap image on a liquid crystal display (LCD) or light-emitting diode (LED) display, or the process of projecting a visible image onto a tangible surface using an LCD, LED, or similar device. Presentation would also include other methods of projection, such as refractively projecting a visible image from a tangible document such as film, fiche, slides, negatives, or X-rays.

Transmission is the transportation of a document through space or between remote locations. Transmission is believed to be a more accurate term than communication, since a document may be satisfactorily communicated and comprehended without requiring transmission (such as by displaying or representing the document.)

One could theoretically distinguish communication by defining cognitive boundaries for each individual involved in the processes of document handling (such as the author/creator, editor/operator, interpreter/reader) and treat communication as transporting the informational content of the document between cognitive boundaries. In comparison, transmission is the physical transportation of a document through space without regard or reference to cognitive boundaries. Transmission may then be thought of as a subset of communication, but devoid of any comprehension requirements. To the extent that communication requires comprehension of information at some level, it is strictly speaking not an operation that is performed on a document, but simply the utilization of one or more document processing operations as intermediate steps in the overall process to achieve the result of interpersonal communication.

Storage and Retrieval is the transportation of a document through time in a static state in a manner permitting the selective acquisition of that individual document from its storage medium. The provision that the document be in a static state is an addition to the traditional definition of storage and retrieval, since a document may theoretically be transported through time by holding the document in active memory without being stored and retrieved. Similarly, the provision that the document be selectively acquired from its storage medium is an addition to the traditional definition, distinguishing storage and retrieval from the independent and unrelated operations of recording and replaying.

An electronic image normally exists in active volatile memory, and what is perceived by the operator as the document is actually a display of the document being repeatedly and instantaneously refreshed by information drawn from that memory, and manipulations of the displayed image are inserted into and held in that memory. Alternately, an electronic image may be swapped to a separate portion of memory such as a volatile RAM disk or cache, which simulates the existence of a magnetic or optical storage medium but at higher speeds. The process of exchanging informational bits in active memory, and the intervening holding of those informational bits, is not considered storage and retrieval. Conversely, one could consider the process of writing an electronic image to nonvolatile semiconductor memory such as read-only memory (ROM) to accomplish the storage and retrieval function, however semiconductor memory is rarely (if ever) utilized for the selective acquisition of electronic images.

The fact that storage and retrieval have conventionally been treated within the boundaries of one operation underscores the unique and reciprocal nature of those two processes, wherein storage implies the ability to retrieve selected documents individually and non-sequentially from among a plurality of sequentially indexed documents. The nature of document storage may be contrasted with that for audio recordings, where there is no reciprocal function corresponding to retrieval. Instead, recordings are either reproduced or they are replayed in a manner corresponding to presentation or representation. Thus, for most purposes the "storage and retrieval" function for recordings forms a closed loop through various other operations, and is normally not treated as a reciprocal function or single operation. Electronic images may be processed through very similar closed loops involving other operations than storage and retrieval when those documents are being treated as (or form portions of) recordings, such as in the case of multimedia processing applications, but these closed loops are not deemed to be storage and retrieval.

The execution of one or more of the operations described above is termed "document processing," which is considered to be a subset of "information processing" since information can exist in forms other than documents. There are similar sets of operations applied to processing information in fields other than the three document domains, each operation having a definition which may be unique or peculiar to that field. However, there is frequently some overlap between the terminology used in document processing and other fields of information processing, as well as the informal or nontechnical use of the same terminology, which can result in some inaccuracy and inconsistency.

For example, electronic content is frequently but erroneously referred to as "data" because people equate that term for computer fries with the discrete elements of visual images that they recognize as conveying exact or immutable information. A person recognizes certain elements (such as numbers, letters, or symbols we term "characters") with a degree of precision that corresponds to their appreciation of how computers read data, without reference to the conceptual principles involved with communicating, understanding, or comprehending the content of that information apart from the incremental elements. A person can view a page of text and differentiate discrete elements such as characters, each of which have an assigned meaning to that individual. The informational content of the page is considered relatively precise or exact, since it is presumed that individuals to whom the document is directed will assign the same meanings to each element. For purposes of determining precision or accuracy, we disregard both the fact that the aggregation and interpretation of those discrete elements may convey completely different concepts to each individual, and we dispense with individuals who assign different meanings to those informational elements than do members of the target group. In the same way, people understand computers to read data with exact accuracy independent from the need for recognition or interpretation, and there are basic hierarchical groupings of formats, programs, languages, and machine architectures that define what meanings will be assigned to discrete data elements for certain purposes. This appreciation may change as the general public becomes more aware of and familiar with the technological processes involved in the conversion of electronic images to electronic content through optical character recognition (OCR), the application of artificial intelligence or fuzzy logic to visual object recognition in robotics systems, or the use of electronic photography to store electronic images on optical recording medium in place of film negatives.

Electronic content can more properly be defined as encoded data plus a set of structural linkages. The data or information is encoded so that it may be utilized or operated on directly without human or artificial intelligence being applied to "interpret" or "recognize" specific information embedded within the document. The structural linkages are usually defined as accepted information storage or interchange formats and vary in complexity from simple linear data strings in which numbers are stored in a one-dimensional forward-reading sequence, through formats such as rich text format (RTF) or symbolic link format (SYLK) files representing data and particular visual attributes for displaying or representing that data on a page, to page description languages such as Postscript in which an electronic image is reduced to and expressed exclusively as mathematical formulas, callable subroutines, or vectors representing individual components from which the electronic image can be interpreted and reconstituted for display or representation.

Two distinct standards have developed for judging the threshold for integrity and requisite precision in the transmission, storage, and retrieval of electronic content versus electronic images.

The integrity of electronic content is based on a quantitative threshold, and complete or error-free precision is frequently presumed. Lack of quantitative precision may have varying degrees of impact on the qualitative integrity of electronic content. For example, a single discrete or one-bit error in an RTF file may have only a minor effect on the textual representation of a character, and therefore a negligible effect on the qualitative integrity of that file when displayed or represented as a page; the same numerical error in a SYLK file may disrupt a localized portion of the matrix such as a row or column in a spreadsheet, but leave a large portion of the spreadsheet intact and unaffected from a qualitative standpoint; a one-bit error in a program file could be fatal to the program's operation and therefore completely destroy all qualitative integrity. Consequently, preventing even one-bit errors in the transmission, storage, and retrieval of any electronic content document is assumed to be mission critical because there is an expectation of absolute quantitative precision (and therefore complete qualitative integrity) associated with electronic content.

Conversely, relatively significant quantitative "errors" may be introduced into electronic images and yet be accepted, because they leave the content and form of the electronic image effectively intact without approaching the threshold established for qualitative integrity in the electronic image domain. Again, it should be noted that thresholds for qualitative integrity in the electronic image domain are currently set at artificially low levels because they are being established or judged as a function of the human visual comprehension of presentations (raster or LCD displays) and representations (paper or film printouts) of the corresponding image.

As discussed below, the conventional wisdom in interactive document processing is to capture an image from a source document, and to keep that electronic image exclusively in the digital domain once it has been digitized. It is commonly believed that maintaining the digital nature of the electronic image preserves the accuracy and integrity of its informational content. In fact, this is a mistaken assumption.

First, it must be remembered that any digitization process relies upon an initial transition from the analog to digital domains, and there is an equal probability of introducing errors in informational content at that step as there would be for any other subsequent analog-to-digital conversion. That is, once an image is digitized it is relatively simple to verify that the "data" content does not subsequently change, however there is no assurance that the original "data" accurately reflects the true informational content of the source document. Added to this is the problem that in order to obtain reasonable transmission and storage times for most document processing, images are routinely captured and processed at bit-depths much less than 8-bits grayscale, and often as monochromatic images of very low resolution. Thus, a great deal of informational content is being intentionally discarded for no reason other than to facilitate subsequently digital processing techniques. The quantity of "errors" that might be introduced by repeated analog-to-digital and digital-to-analog conversion of an electronic image still remain many orders of magnitude below the quantity of "errors" that are interjected into images by current document processing technologies.

Second, if the capture device defines the rate limiting operation in the signal conversion process, the technology disclosed herein provides informational integrity equivalent to exclusively digital processes. If the storage device defines the rate limiting operation, and the capture/storage/retrieval/transmission pathway involves four conversions between analog and digital signals, the system has only increased the probability of losing a "pixel" by three times when compared to an exclusively digital process. Since the informational content is several orders of magnitude higher than a conventionally processed digital image, a three times increase in the probability of an error in one "pixel" is insignificant. It should also be remembered that this discussion focusses on the complete loss of a pixel, whereas in an analog frame of reference an error might actually amount only to shifting a pixel to a slightly higher or lower gray level. Isolated errors of this type would be completely imperceptible when imbedded in an image comprising more than a million adjacent pixels, with each pixel having two hundred or more possible discrete grayscale values. The actual effect of an error of this type is further reduced when one considers the potential for applying oversampling and signal averaging techniques for each analog-to-digital conversion.

The application of hybrid processing may thus be equated with a tradeoff between the sanctity of bit-value integrity for the sake of vastly increased processing speeds. However, the loss of bit-value integrity is relatively meaningless when applying this technology, because the techniques for maintaining reasonably high precision in analog-to-digital conversions reduces the frequency at which errors may occur, and any error becomes statistically insignificant if one considers the many-order increase in the magnitude of informational content when using greater bit-depths that effectively dilute any error.

The use of 8-bit grayscale is preferable for most current interactive document processing operations since it provides a displayable image having far superior informational content than conventional techniques for storing tangible source documents (which often treat the original source document as line art and rely on conversion to monochromatic or one-bit levels which discards the majority of the document's actual informational content.) It has been shown that an 8-bit grayscale image is actually more readable than a lower level or monochromatic image corresponding to the same document, due primarily to the wealth of informational content situated in the zone situated above the full content of a lower level image and below the portion of the 8-bit grayscale image that is beyond the limits of visual perception. As such, there is a large portion of a true 8-bit grayscale image that cannot be visually perceived without the aid of enabling equipment, and which would be discarded in normal viewing. The ability to display an electronic image in 8-bit grayscale therefore also permits a wide range of user-definable adjustments in the contrast levels and grayscale filters to be applied to the viewed image that facilitate interactive discrimination or enhancement of the informational content in the image for certain applications (such as diagnostic review of X-rays, MRI scans, or other medical images) without affecting or altering the source document or its stored image.

In addition, the 8-bit grayscale electronic image will contain background details such as security paper patterns, watermarks, illegible color inks, markings that are faded or too faint to be perceived by viewing the original source document, as well as creases, smudges, stains, and other unique identifying details that assure far greater certainty when verifying the integrity and authenticity of the electronic image, far exceeding the currently accepted standards for duplicates of financial, business, and legal records. The use of 8-bit grayscale also permits the capture of electronic images from damaged or aged tangible source documents such as burnt papers or faded microfiche that could not be reproduced by other means, and which may be accomplished as if the original source documents were undamaged.

Because electronic images currently exist as bitmaps or digital arrays in semiconductor memory, they are transmitted, stored, and retrieved in digital form and these operations do not themselves introduce quantitative errors in the content of the electronic images. The most significant "errors" or losses in content generally result from intentional transformations occurring during processing steps such as digitizing a tangible document into an electronic image, or formatting an electronic image for integration into a program or as part of a file storage protocol.

It must be remembered that the acceptable threshold for qualitative integrity of electronic images as used in reference to the technology disclosed herein is several orders of magnitude greater than can be perceived by human vision when viewing a tangible document, and is at or near the limits of what can be practically achieved by conventional representation devices such as laser printers or film recorders. Consequently, while the technology disclosed herein will normally be implemented in embodiments which provide less than the absolute or complete quantitative precision associated with conventional digital modalities for purely practical reasons, the qualitative integrity of documents created in or converted to the electronic image domain and subsequently transmitted, stored, and retrieved by the disclosed modality will exceed that currently accepted for document processing in the electronic image domain and yet permit substantial decreases in the time required to complete those processes.

The methods disclosed herein may be applied equally to documents in either the electronic image or electronic content domains. However, the use of this modality for processing electronic content will be only be adopted if a sufficient threshold level of quantitative integrity (as defined by the particular application involved) can be consistently maintained or verified. The complexity or expense associated with assuring this requisite level of quantitative integrity for electronic content may be commercially prohibitive given the adequacy of conventional systems now used extensively for digital transmission, storage, and retrieval of electronic content, despite the significant differential in speeds at which the technologies would operate.

Furthermore, at present the vast majority of personal and business communication is conducted using documents that remain almost exclusively in the tangible or electronic image domains, and the immediate need for applying this modality to electronic images far supersedes the comparatively insignificant demand for accelerating the processing of documents in the electronic content domain. Application of this modality to documents created in or converted to the electronic image domain provides an effective precision that is functionally indistinguishable from complete qualitative integrity, and therefore substantially greater than basic levels of qualitative integrity now utilized for tangible and electronic image documents. In addition, the complexity and expense associated with this modality are no more than for existing technologies.

For those reasons, the remainder of this discussion will focus on documents in the tangible and electronic image domains, however it is understood that the modality may be readily applied to the electronic content domain if adapted or augmented to provide suitable assurances that acceptable quantitative precision can be consistently maintained or verified throughout the transmission, storage, and retrieval processes.

Since the focus of this discussion is on particular embodiments designed for the tangible and electronic image domains, it is presumed that any "data" embodied within a tangible or electronic image exists as a function of the document's content and form. Therefore, any data contained in a document is subject to comprehension and recognition by the visual inspection of presentations or representations of the image by humans, who may then manually transcribe or encode that data for use as electronic content, or by the application of artificial intelligence to recognize, interpret, and encode that data from within the image.

There have traditionally been four additional operations associated with transposing or bridging a document from one domain to another: scanning or capture (tangible to electronic image); recognition (electronic image to electronic content); rasterization or bitmapping (electronic content to electronic image); and output or marking (electronic image to tangible.) These operations do not encompass two possible transitions which could occur directly between the tangible and electronic content domains, however virtually all technology now in use relies on some intermediate transition through the electronic image domain.

This terminology can be somewhat misleading. For example, a raster is conventionally defined in electronics as a uniform rectangular pattern of scanning lines having an aspect ratio determined by horizontal and vertical synchronization and timing (or blanking) pulses that is produced on a cathode-ray tube (CRT) in the absence of a modulated signal. In image processing, however, a raster usually means the display of the digital array associated with an electronic image on a raster device such as a monitor, which could as easily be displayed or projected directly as a bitmap using an LCD or LED device. Furthermore, the scanning lines in a raster have no relation to the process of scanning a tangible document in most devices that are called scanners, which conventionally incorporate line- or area-array CCD technology.

It may be readily appreciated that an electronic image exists as a digital array in memory and does not require being displayed as a raster or bitmap, but such a presentation is merely an aid for human visualization and comprehension of the electronic image as it resides in memory. The display is therefore a "virtual" document and the bitmap or digital array is the true or "original" document. The process of transposing a document from the electronic content domain to the electronic image domain really constitutes mapping the image into a digital array in memory, thus the term "bitmapping" has been added to the conventional nomenclature for this transition.

Similarly, transposing a document from the tangible domain to the electronic image domain requires the same mapping of an image into a digital array in active memory, and could just as well be termed "bitmapping." In the field of document processing, where an operator works at a computer or workstation, the term "scanner" has traditionally been applied to a peripheral capture device which creates a digital army or bitmap of a tangible document, and that digital array is simply "dumped" or swapped into a segment of active memory within the computer. Conversely, if the peripheral capture device produces an analog output of sequential frames, the transition to a digital array or bitmap may be performed by the process commonly called "frame grabbing" either by the peripheral device or on board the computer. In this case, the term "capture" is utilized to include both the processes of scanning and frame grabbing where a digital array or bitmap of an electronic image is produced and resides in active memory.

As previously noted, the transition between any two domains almost always results in some transformation of the original document to a new or derivative document, whether or not that transformation is visually perceptible. Similarly, any presentation or representation of an electronic image either produces a virtual image or creates a new tangible document. Theoretically, the virtual image and the new or derivative document should be identified and treated as new documents having different informational content and form than the original document residing in memory as an electronic image.

Many factors affect the degree to which the informational content in a presentation, representation, or transformed image diverges from that of the original document. Because informational content is judged as a function of visual recognition, three factors have become basic to measuring the informational content of an image: kind, depth, and density.

Kind designates the classification of the image, and for purposes of this discussion may be monochromatic, grayscale, or color. These three kinds of images encompass most or all of the visually perceptible documents. At the same time, it should be remembered that there are other types of documents (and certain information within otherwise visible documents) that may only be perceived with some type of enabling technology. Infrared and ultraviolet represent two familiar examples where enabling technology produces images containing informational content that is not otherwise visually perceptible, but it should be remembered that true grayscale also contains large quantities of informational content that may be otherwise discarded in human visualization.

Depth is a digital measure of the quantity or "bits" of information associated with each informational bundle or picture element ("pixel.") The most frequently used depths in interactive document processing are one-bit (effectively monochrome), 4- and 8-bit for grayscale, or 8-, 24-, and 32-bit for color.

Density is the physical spacing of informational bundles in pixels per unit measurement. Density is irrelevant to an electronic image, and only becomes a factor to consider when presenting or representing an image. Density is often interchanged with resolution, and different standards and references have developed for display resolution and printing resolution. However, resolution is really a function of image comprehension as determined in the visual frame of reference. When the term resolution is used in interactive document processing, it is being used as shorthand for the "absolute resolution" which is the minimum separation between pixels or informational bundles that may be distinguished or resolved.

Density and resolution are important terms in document processing because they permit operators to specify an acceptable level for representing or presenting a document. They are also easily confused when comparing representation resolution with presentation resolution. For example, referring to FIG. 8, one might specify outputting an electronic image such as a continuous black-to-white 8-bit grayscale gradient to tangible form on a 300 dots-per-inch (dpi) laser printer for one use, but a much higher resolution for another. These specifications are further complicated by the fact that most tangible output devices are monochromatic, and grayscales are simulated or approximated by applying a selected halftone screen to the image, or printing the image as a dither pattern to approximate levels of grayscale. The halftone screens are usually denoted by the frequency (number of lines per inch) and the angle of orientation. In any case, the true resolution of the output device remains constant while the effective density of the image changes, and the actual informational content of the outputted document decreases compared to the original electronic image. A four bit grayscale gradient would therefore theoretically contain 16 shades of gray including black and white, but if printed at 300 dpi would show only about 12 gray levels due to the type of dithering pattern used and the processor's calculation of the optimal number of steps to create a smooth blend or transition between levels. As such, in the example recited above, the 8-bit grayscale gradient printed at 300 dpi resolution may result in approximately 58 visibly discernable gray levels or less (FIG. 8B) with the dots of the dithering pattern being very apparent, whereas the same gradient printed at a 3360 dpi with a 150 line horizontal screen will produce the same number of gray levels (FIG. 8C) but at a much higher resolution. As such, specifying a higher resolution may achieve a great increase in informational content without increasing the grayscale depth, and increasing the grayscale depth may also greatly increase the informational content without requiring higher resolution. This may be compared with a true 8-bit image viewed on a monitor in which each "pixel" is displayed at one of 256 discrete gray levels, and which has a resolution on the order of 70–80 pixels per inch. It may be appreciated that increasing both resolution and grayscale depth will have a corresponding impact on informational content.

For purposes of creation and transformation in the electronic image domain, an image is usually treated as being composed of bitmaps, objects, paths, models, or renderings. Bitmaps are created and transformed by altering the characteristic value assigned to individual pixels within the bitmap. Objects and paths are transformed by altering either the fundamental definition of the object or path, or a characteristic attribute associated with that object or path. Attributes may be very simple or extremely complex, and attributes of paths may depend upon linkages and relationships to other paths and their attributes. Objects are generally self-contained. Models are the three dimensional equivalent of objects, but are composed of one or more assembled structural blocks. A rendering is essentially a complex bitmap created by applying attributes to a model, but which cannot be interactively transformed by altering the characteristic value of separate pixels.

Objects, paths, models, and many renderings are usually "device density" or "output resolution" dependent, meaning that they are treated within an interactive program as formulaic expressions each having a set depth but variable density, and when presented or represented they will adopt the highest density afforded by the capabilities of the presentation or representation device. For example, a simple arcuate path expressed in Postscript language will have a shape, size, and a specified value within the range dictated by the image's grayscale depth. When output on a 300 dpi printer, the image will have the same basic shape and size as the electronic image, but the printer will utilize its 300 dpi density to provide the best approximation or effective resolution of the grayscale value and path contours defined by the formulaic expression as possible. Output on a 1250 dpi printer will again have the same shape and size but higher density, meaning that the effective resolution of the grayscale level and path contours will more closely match the formulaic expression. Effective resolutions may be so low that losses in informational content are clearly perceptible, or so high that they exceed visible comprehension. The nature and use of the tangible document being represented or the virtual image being presented will dictate the preferred or acceptable effective resolution.

The three measures of the informational content in an electronic image are completely independent of the image's physical size. As a practical matter, limitations imposed by the processor speed, available memory, and storage medium in a document processing system will sometimes require reducing an electronic image's depth or density as its physical size increases. Kind, depth, and density may also be selectively manipulated to achieve a particular visible or perceptible result when an electronic image is transformed, represented, or presented.

Advances in both interactive and non-interactive document processing are evaluated according to five criteria: compatibility, transparency, decentralization, modularity, and operational capacity.

Compatibility refers to the capability of different technologies to utilize the informational content of a document.

Compatibility is now limited to storing a document in one or more predefined formats, with interactive document processing programs having the ability to access information only from specific formats. Usually, the higher the level of a program the more formats in which it will store and retrieve a document. If a format or conversion is unavailable, all or a portion of the informational content of the document will be inaccessible. For the most part, compatibility in transmission is limited to modem and network protocols for electronic content and facsimile and network protocols for electronic images.

Transparency has two definitions. At one level, transparency is the movement of documents between domains without loss of informational content. Operational transparency is the ability of an user to employ a technology without conscious consideration of the inherent transformations produced by that technology. In interactive document processing, effective transparency can be defined as the transition from the tangible to electronic image domain without a visually perceptible loss of qualitative integrity, and as equivalent access to electronic image documents through transmission or retrieval processes independent of the location of the original document and without regard to intermediate transformations.

Decentralization refers to the ability of users of communicating systems to perform the same document processing operations on the same documents, and to have the same capabilities that are available to operators at a central document processing or coordination facility.

Modularity refers to the linking of single- or multi-function devices for document processing. Modularity increases the functions performed by devices, or increases the available linkages between devices, to optimize paths through which documents are processed. For example, merging a scanner with a printer to accomplish the functions of scanning, photocopying, facsimile reception, and printing is a higher order of modularity than having four separate devices performing the same four functions. Another facet of modularity is scalability, which permits the addition (or subtraction) of a redundant peripheral device to a system to increase (or decrease) a particular operational capacity of the system without requiting replacement of the complete system. For example, the addition of a SCSI hard drive to a personal computer permits the system to be scaled upwardly to increase its information storage capacity.

Operational capacity for most interactive document processing is determined by measured capabilities or benchmarks such as processor clock speeds (in megahertz), millions of instructions performed per second (MIPS), bit depth of semiconductor memory, access times for semiconductor memory (in nanoseconds), transmission rates (in baud), storage capacity (in megabytes), storage density, and seek and read/write speeds (in milliseconds to microseconds).

Statement of the Problem

A dilemma has existed since the advent of digital processing for electronic images.

First, digital signal processing is inherently slow, and designers have been unable to obtain high resolution at fast speeds using digital technology. Second, analog signal processing is fast, but designers have been unable to produce and process high resolution images or provide the ability to interactively interface with electronic images in analog form. Furthermore, analog signal processing presents problems such as signal loss, degradation, noise, and distortion that have been unacceptable for interactive document processing applications (particularly in transmission or storage and retrieval operations), and selective storage and retrieval capabilities have not been developed in the analog form.

In discussing the speed of transmission, storage, and retrieval of documents created in or converted to the electronic image domain, it is important to bear in mind that this modality is concerned only with electronic images that are expressed as a bitmap or digital array in semiconductor (or other) memory that will be utilized for the selective transmission, storage, and retrieval by an operator.

The constraints in the speed at which electronic image documents may be transmitted, stored, and retrieved result from the application of technologies designed primarily for electronic content to all electronic domain documents, and the inherent nature of the digital technologies used to process electronic content. For example, conventional compact discs or magnetic hard disk drives will have seek times on the order of milliseconds, and read/write times on the order of microseconds per digital word. This is approximately two to three orders of magnitude slower than the routine transmission, storage, and retrieval rates for the technology disclosed herein, which operates corresponding to the nanosecond time range that conventional static random access memory (SRAM) is capable of exchanging bit groups.

The routine transmission, storage, and retrieval rates of the technology disclosed herein will be positively affected by the utilization of memory having faster access times, as well as the capability to process larger digital words. The limiting factors become the speed at which sequential access semiconductor memories (such as CCDs) can be operated as the size of the digital arrays increase, and the signal exchange rates at which optical and magneto-optical storage media can perform.

Description of the Prior Art

The modality disclosed herein may be applied in either one of two forms: (1) the conversion of tangible documents to electronic images and the transmission, storage, and retrieval thereof; or (2) the creation or transformation of documents in the electronic image domain and the transmission, storage, and retrieval thereof. In the preferred embodiments for document processing in business environments, an integrated system having both capabilities operating in tandem is disclosed. There are two equally satisfactory views of this integrated system. If considering the first form, one could view the system as a four step process comprising the steps of source capture, image digitization and handling, image storage, and image retrieval. Conversely, in considering the second form one could view the system as comprising a core process of image handling (holding and manipulating a bitmap in active memory), image storage or transmission, and image retrieval, with the steps of source capture and digitization being ancillary or optional processes utilized only when converting tangible documents to the electronic image domain.

The majority of interactive document processing occurs in a user- or operator-interactive environment which may be referred to generally as interactive document processing (IDP). Almost all interactive document processing is performed using a computer as the interactive processor. The computer may be a dedicated device such as a word processor, a personal computer, workstation, or a computer or terminal linked to a file server or mainframe by a network.

In these systems, once an image is created in or converted to the electronic image domain as a digital array or bitmap, it remains in digital form throughout all subsequent operations even when the digital array is transmitted, stored, or retrieved.

Preservation of the digital format is maintained for two reasons. First, the electronic image is being handled as electronic content for purposes of storage and retrieval because current storage methods do not differentiate between electronic content and electronic images, and absolute quantitative precision is dictated for the electronic content including programs and data files. Electronic content is not separated from electronic images, and one device is utilized simultaneously for the storage of both electronic content and electronic images. The value of the depth for each pixel of an electronic image is therefore also stored on the available medium in digital form as though it were electronic content. This preservation of the digital format for transmission, storage, and retrieval of electronic images has remained almost exclusive and inviolate since the introduction of semiconductor memory. Only recently have other means of recording and replaying electronic images been introduced for use in multimedia processing, however these means have no applicability to the transmission, storage, and retrieval of electronic image documents.

Second, digital transmission systems provide better signal to noise ratios resulting in higher efficiency for a set precision. (Purely electronic systems are conventionally not measured according to precision, but rather by the efficiency achieved by in a system given a predetermined precision threshold and a set transmission configuration.) As such, digital transmission provides very high efficiency when the required precision is nearly absolute, but is extremely inefficient when compared to analog transmission for precision levels only slightly below absolute. Since absolute precision is presumed for transmission, storage, and retrieval of electronic content, digital transmission is used for both electronic content and electronic images.

The result has been to apply digital technology wherever possible to produce inter-device compatibility (for example, between telecommunications systems, facsimile transmission devices, and personal computers), and the demand for digital components used to transmit, store, and retrieve information has resulted in commercial devices which are readily available and inexpensive. In fact, the prevailing trend has been to adopt digital systems for many other information processing and recording systems such as audible telephone communication, compact disc recording, and digital audio tape (DAT). These digital technologies are not without many real merits and advantages that may readily be appreciated by both the technology designers and users of the particular consumer devices, and there has been a corresponding shift among product designers and consumers towards preferring digital technology for purely aesthetic reasons.

Examples of the proliferation of digital technologies for storing and retrieving electronic images include many of the CD-ROM drives and applications that are commercially available for personal computers, the development of the Kodak Photo-CD standard currently being implemented for transferring 35 mm photographs directly to compact disc, and the use of rewriteable optical and magneto-optical disc recorders for file storage.

Even though it is known that the qualitative integrity of an electronic image may not be perceptibly diminished by the utilization of an analog format, no technology has yet been developed for the transmission, storage, and retrieval of electronic images in the field of interactive document processing.

Outside the field of interactive document processing, there are some representative examples of new developments concerning the application of analog technology to information processing.

Efforts to produce major developments in analog technologies for television and broadcasting have been focussed on the development of high-definition television systems, the production of larger array CCD cameras, the utilization of satellite transmission, and the use of optical laser discs for recording.

In the field of radar scan conversion, various processes have been applied to increase the rate at which polar coordinate maps can be processed and converted to an X-Y memory map and displayed using raster devices. U.S. Pat. No. 4,754,279 to Cribbs discloses a scan converter which accomplishes the conversion of an analog radar signal to a digital array through two high speed memory buffers and an intervening segmentation of the electronic image in active memory, and the subsequent assembling and display of that array as a raster image corresponding to the bitmapped electronic image. Similar polar to X-Y scan converters are also found in ultrasonic and other medical imaging devices, with a representative example being U.S. Pat. No. 4,275,415 to Engle.

Scan converters related to those disclosed in the Cribbs '279 and Engle '415 patents have also been utilized with certain modifications in systems to scan tangible documents and store the corresponding electronic images as frames in a conventional video tape format. These systems may be interfaced with a conventional personal computer, and representative examples of such systems include those currently marketed by Folsom Research of Folsom, California and RGB/Spectrum of Alameda, Calif.

Although the technology disclosed in the Cribbs '279 and Engle '415 patents and the Folsom or Spectrum devices permit operators to record sequences of electronic images at rates exceeding those for current digital components, they do not provide the required capability for transmitting, storing, or retrieving electronic images.

In particular, the technology related to radar scan converters is directed to monochromatic images, and involves certain operations for correlating discrete segments of adjoining raster lines to the corresponding pixels in a digital bitmap. The current technology also relies on using a nibble-mode for reading and writing information from high speed buffers to update only the pixels in the digital array corresponding to radar pixels that are activated or faded as a target moves, and this technology does not translate to grayscale or color images having far greater depth, nor to the transmission, storage, or retrieval of complete electronic images.

The commercial devices that may be interfaced with document processing systems further do not permit indexing and acquisition of selected images at workable rates for interactive document processing operations, but rather rely on replaying instead of retrieving documents. These devices utilize the broad bandwidth obtainable with magnetic tape mediums for recording electronic images having greater than one-bit depth in a format that corresponds to a video "frame." In comparison, the storage and retrieval of electronic images at high rates (in tens of images per second) and large volumes (tens of thousands of images per unit of medium) requires indexing and selective acquisition of stored images on a medium such as an laser or optical disc, which has fixed bandwidth and limited frame composition.

Retrieval and display of stored electronic images at roughly comparable rates (one or more images per second) and volumes (fifty thousand images per unit of medium) are currently accomplished on rewriteable optical disc recorders such as the Panasonic LQ-4000 Erasable Videodisc Recorder, however this returns the storage and retrieval operation to the digital format, and current systems only permit limited operation for capture and storage before encountering downtime for processing.

The application of hybrid signal processing to accomplish signal compression for serial recording is also known to the art.

U.S. Pat. No. 5,006,936 to Hooks discloses a method of compacting a analog signal corresponding to unframed continuous-signal data output wherein an instrument's analog output signal is converted to a digital signal, and portions of the digital signal are alternately written to two memory buffers. As the digital signal is being written to one memory buffer, the other memory buffer is simultaneously read at a faster rate than it was written. The compacted digital signal is then converted to an analog signal having a greater bandwidth than the original data output signal, and the appropriate synchronization signals are applied corresponding to a conventional NTSC video format. The compressed and NTSC-synced signal is then stored using conventional video equipment such as a magnetic tape or optical laser disc recorder. A decoder circuit is utilized to strip the synchronization signals and decompress the signal back to the original unframed continuous-signal data output for serial replay at the same rate as the original data was produced. The Hooks '936 device therefore compresses a one-dimensional time-variable signal by increasing its bandwidth sufficiently that synchronization pulses may be added to fill the gap between the compressed signal and a standard NTSC video format, and then utilizing that NTSC equipment for recording and playback.

Methods for compressing analog signals using hybrid signal processing similar to that disclosed in Hooks '936 have been utilized for many years. While the Hooks '936 device provides an effective system for the recording and playback of large spans of unframed continuous-signal transmissions such as flight recorder data using lower cost NTSC video equipment, compaction methods such as disclosed in Hooks '936 are not applicable to the selective and non-sequential transmission or storage and retrieval of two-dimensional electronic images. First, the compression method described in Hooks '936 is most suitable for magnetic tape recording which may accommodate and utilize the comparatively unlimited bandwidth of video tape, whereas the bandwidths associated with the informational content of two-dimensional electronic images (particularly those having conventional grayscale or color depths used in interactive document processing) are already greater than NTSC equipment would permit, and signal compression would only increase the bandwidth. Second, compaction methods such as disclosed in Hooks '936 permit only serial playback of continuous-signal data output. Third, continuously alternating the flow of signal to or from two separate memory buffers prevents utilizing those memory buffers at the junction with an interactive document processing interface.

Various references in the prior art have discussed "stitching" techniques used to combine the outputs from two CCD arrays for use in a flatbed scanner, and for permitting the use of NTSC display devices for viewing high definition television (HDTV) broadcasts.

U.S. Pat. No. 4,378,571 to Handy discloses a technique for increasing the field of view of a flatbed scanner while maintaining the device's original resolution by using two CCD chips fixed in an array having a specified displacement relative to one another that corresponds to one half of the total field of view. The analog output signals of each CCD are sampled and averaged, and the gross grayscale levels for the two halves are equalized with one another by amplifying the DC gain level for one or both of the signals toward a common level. The signals are then processed by an analog-to-digital converter to digitize the image.

This technique is essentially a simplified version of "ganging" smaller CCD chips to produce a larger X-Y pixel matrix, wherein a first row of pixels are read sequentially from one CCD chip and the aligned first row is then read from the second CCD chip, followed by the second pair of rows from each CCD chip, and so forth to produce a "horizontal" bitmap. It is also possible to simply read all the rows of one chip followed by all the rows of the second, to produce a "vertical" bitmap. Ganging more than two CCD chips in each direction results in a combination of both horizontal and vertical bitmapping between different CCD chips. This technique was used in video cameras when CCD chips having only a 512×512 X-Y pixel matrix were available, however cameras using CCD chip matrices of 1024× 1024 and 2048×2048 pixels are now readily available (and could similarly be ganged to produce even larger matrices.) The principle of the Handy '571 patent has apparently also been applied to hand-held scanners which are used to sequentially scan parallel strips of a source document, wherein the speed at which the timing wheel within the scanner is rolled across the document provides a crude physical control or reference for the number of pixel rows-per-inch that are scanned (or conversely, the ratio by which one strip is scaled along its length to match the pixel rows-per-inch of another strip.)

As such, the Handy '571 patent does not teach an actual "seaming" process for reconstituting divided images, and it also points out the inherent errors in the informational content of an image that may be surreptitiously introduced on a very large scale when using conventional digital techniques for document processing operations. The Handy '571 patent further does not teach any of the time-based correction and masking principles necessary to make the actual seaming of a divided image possible, nor to overcome time-based errors introduced by optical laser disc recorders and other devices. The Handy '571 device also places the analog multiplier used for gain correction upsteam of the analog-to-digital converter used for digitization, and therefore reinforces the existing assumption that conversion to the digital domain is a priori necessary for image processing.

U.S. Pat. No. 4,899,220 to Basile discusses a technique for permitting the center portion of a wide aspect ratio high definition television (HDTV) broadcast to be viewed on a conventional NTSC display, and alternately a display apparatus used in combination with a conventional NTSC display for viewing the entire wide aspect ratio image. The Basile '220 patent teaches dividing the scan lines into segments corresponding to a center portion of a wide aspect display and two side panels, converting to the NTSC format for broadcasting, and reassembling those segments after broadcasting. However, this procedure produces visible lines vertically bisecting the display due to dot crawl. Consequently, Basile '220 also teaches randomly varying the location of the stitch points between the line segments of adjacent lines or between fields, thus scattering the stitch points throughout the image and varying their location between fields to a degree where the stitch points will not produce a visible pattern interrupting the image when displayed at 30 frames per second.

It may be readily appreciated that Basile '220 does not teach eliminating the visible stitch points, but merely relocating them so that a viewer will not perceive them when viewing a many changing images displayed each second. As such, the technique of Basile '220 cannot be applied to document processing operations where the introduction of stitch points would still degrade the informational content and undermine the integrity of a stored image. Even though the degradation might not be visible when displaying many changing images, some degradation would be visible when viewing a static display of the same image, which would render the system unsuitable for many operations such as medical imaging. Furthermore, since the Basile '220 process relies on random distribution of stitch points among unrelated images, the effects of these degradations would accumulate rapidly when repeatedly storing and retrieving the same image, to the point where the image could be effectively destroyed over time. While the technology of Basile '220 is suitable for raster display purposes where the camera or broadcast generator has a very stable output, analog storage devices such as laser disc recorders or players have significant time-based errors in their output signals which cannot be corrected for using the technology disclosed in Basile '220, just as it does not provide any time-based correction to prevent the visible stitch points. The Basile '220 and Handy '397 patents are therefore similar in the fact that they do not give any consideration to absolute timing relative to an external reference.

Moreover, while the masking technique accomplished by varying the time at which line segments are switched in controlled amounts is a strong feature when considering a displayed broadcast image, the method disclosed in the Basile '220 patent apparently only permits manual control over image content without providing any grayscale calibration, DC matching, gain adjustment, or color control between adjacent line segments or on a line-byline basis. In addition, the Basile '220 device (with or without the ability to display the side panels) is still limited to the conventional resolution of the display, which in this case is the normal NTSC resolution.

As such, technologies of the type disclosed in Basile '220, Handy '571, Hooks '936, and many other references in these distinct fields of art provide very good solutions to particular problems associated with converting between display or recording formats, ganging capture devices to increase the effective field of view, and the like.

However, it is believed that the prior art does not teach, suggest, or even address the much broader concept of interactive document processing in an hybrid (analog/digital) domain utilizing techniques such as multiplying the effective resolution of a capture device, segmenting the existing bitmap of an electronic image to optimize its informational content versus its transmission, storage, or retrieval times for a given operation or existing apparatus, storing an electronic image having a predetermined informational content on randomly accessible storage mediums having fixed bandwidths which are smaller than those associated with the original image, transmitting an electronic image via a transmission pathway similarly having a limited bandwidth smaller than that associated with the original image, integrating these processes in an interface which permits interactive utilization of an electronic image and transparently passing the image back-and-forth between conventional low speed digital processing pathways and high speed analog processing pathways, nor the many independent advantages and synergistic effects achieved by applying these concepts as part of a complete document processing environment, network structure, or communications system.

BRIEF SUMMARY OF THE INVENTION

It is therefore one object of this invention to provide a method for capturing, transmitting, storing, and retrieving documents created in or converted to the electronic image domain which overcomes the obstacles imposed by the inherent speed limitations of the digital domain and the low resolution and perceived imprecision of the analog domain, yet which permits subsequent use of digital interfaces for interactive document processing.

It is a related object of this invention to design the above method such that it utilizes hybrid signal processing to accomplish the dissection of an electronic image into a progressively increasing number of segments and the a posteriori[1] reconstruction of a complex electronic image or a multi-image document from those segments.

[1] Literally "after the fact" or "deduced from experience;" implying going from effect to cause, or from fundamental components to complex structure, by reversing a previous process or chain of logical operations.

It is thus another object of this invention to design the above method such that it permits the unrestricted deconstruction or disassembly of a source document in order to optimize the informational content and processing time needed to accomplish a particular document processing operation using specified equipment to achieve a desired end result, and further permits the subsequent seaming together of a virtually unlimited number of related segments (or unrelated image memory maps) to reconstitute or create documents having extensive physical dimensions.

It is accordingly an additional object of this invention to design the above method such that it employs both digital and analog signal processing techniques at predetermined points to achieve the particular advantages associated with the respective signal processing domain, and minimize or eliminate the adverse characteristics of the converse domain.

It is an object of this invention to provide a system for processing documents created in or converted to the electronic image domain which treats the electronic image in a "fundamental" form independent of any transformation or manipulation, and which is therefore universally compatible with any existing or later established standard or format for digital input, output, transformation (including compression), presentation, or representation.

It is an associated object of this invention to facilitate the transparent integration of such a system into current interactive document processing environments.

It is yet another object of this invention to design the above system so as to introduce virtually unlimited scalability for capture, storage and retrieval, and transmission capacities to relatively large document processing systems and databases, particularly for networks in which the fileserver is a mainframe computer.

It is a unique object of this invention to design a system for the capture of electronic images from tangible source documents, and the subsequent transmission, storage, and retrieval of those electronic images, which permits complete decentralization of document processing operations among remote networks, and permits remote operators to transmit, store, retrieve, and receive documents with the same capabilities and access available to a central document processing or coordination facility.

It is a related object of this invention to increase the modularity of a document processing environment by linking storage and retrieval functions performed by peripheral devices with the processors responsible for document transformation and presentation, thus enhancing the operational capabilities of the entire system compared with existing technologies, and to further increase the modularity of the system by linking components by both conventional and high speed networks.

It is a further object of this invention to design the above system such that it may be constructed using currently available recording technologies and established frame formats, as well as subsequently developed technologies and formats for recording electronic images including but not limited to those for optical laser disc recorders utilizing blue-green lasers, greater bit depths, and multiple substrates.

It is a related object of this invention to design embodiments of the above system incorporating time-based corrections to allow the invisible seaming of segments in an image and correcting time-based errors that are introduced by conventional recording devices such as analog optical laser disc recorders, as well as incorporating calibration controls that permit "on the fly" adjustment of grayscale levels between lines or segments, maintain grayscale consistency and precision throughout all frames, and permit selective viewing enhancement by displaying a range of grayscale levels corresponding to a desired amplitude examining area within the image at the optimal base level for an existing display device and for a particular application (similar to the effects created by adjusting "brightness" and "contrast" to optimize a grayscale range within a displayed image.)

It is a specific object of this invention to design several embodiments of the above system for capturing, storing, and retrieving electronic images from within an interactive document processing network which permits electronic images corresponding to US letter-sized pages (or smaller) to be captured and stored in at least 8-bit grayscale at batch processing rates of 5 to 30 source documents per second or greater (depending upon the image size and informational content), and transmitted at rates of 18,000 to 108,000 documents per hour or greater.

It is a related object of this invention to design the above system such that it may be utilized to establish separate high speed network and facsimile transmission protocols for transmitting documents at equivalent speeds, as well as integrated with existing networks and communications systems in a manner that would increase the transmission rates which may be achieved using conventional transmission pathways.

It is an object of this invention to design the above system such that transmission operations will be compatible with traditionally non-document based communications systems, including such alternatives as multichannel RF television transmission, broadcast cable television transmissions, microwave and satellite transmission, and be compatible with conventional communications-based security techniques such as line scramblers and encryption algorithms.

It is a distinct object of this invention to design the above system such that it may be immediately implemented in existing document processing environments (such as financial institutions, medical centers, universities, businesses, and research facilities) using conventional interactive document processing hardware (personal computers, networks, and mainframes), and commercially available equipment for image capture and mass storage which adhere to existing uniform standards and formats.

It is therefore a related object of this invention to design embodiments of the system such that they may be interfaced with conventional personal computers and local area network systems operating with existing commercial capabilities, one representative example being a personal computer having an ISA bus, an Intel 486 processor, a clock speed on the order of 33–66 Mhz, 70 nanosecond RAM, and interfaced with a conventional Novell or Ethernet network.

It is another object of this invention to design embodiments of the system wherein each image may be stored on a unit of storage medium and addressed by a volume and frame number, and wherein a field may be added to established databases in order to correlate batch-processed documents with their original source documents or transactions, or conversely a separate database may be utilized as a "look-up table" to identify or retrieve the volume and frame number of the stored image corresponding to a specific source document or transaction.

It has been proposed that breakthroughs in the operational capabilities of five technological areas will be necessary to convert the majority of existing business and technical document processing environments from "primarily tangible" to "primarily electronic," thus achieving an effectively "paperless" document processing environment (irrespective of source document form.) Those basic technologies are storage/retrieval servers comprising file storage and indexing capabilities, transformation servers to permit complete or universal compatibility of document formats, communication servers that provide transmission interfaces for both networks and remote transmissions (i.e., satellite, fiber optic, telephone), recognition servers capable of capturing and preserving the fundamental information from tangible documents, and document managers to track the location, flow, and transformation of documents.

It is therefore an object of this invention to design the method and system of this invention such that it achieves the goal of providing sufficient hardware capabilities in each of the five basic technological areas that would permit a primarily electronic or "paperless" document processing environment for business and technical applications.

It is a related object of this invention that the system facilitate the retention of electronic images corresponding to the "original" tangible source documents which contain and preserve significantly more usable information than can be appreciated or recognized by human visual perception of the source document, and which further may provide an audit trail and security capabilities to ensure and verify the authenticity of the fundamental electronic image.

It is a further object of this invention to design the hardware components necessary to establish an electronic publishing and archive system (such a system having previously been postulated to maintain every "original" document in storage on only one of a plurality of file servers that may each be accessed independently by any operator within the system, and in which distinct documents may be connected to one another using hypertext pointers) within existing time and expense parameters for users of conventional business and technical informational databases.

Briefly described, the invention comprises a method and apparatus for the high speed conversion of tangible source documents to the electronic image domain, and the subsequent transmission or storage and retrieval of those electronic images, utilizing hybrid (analog and digital) signal processing. The system employs a higher bandwidth analog signal for image capture and lower bandwidth analog signal for transmission or storage and retrieval, with an intervening digital memory buffer utilized to construct a bitmap of the image to facilitate various dissection and seaming schemes which optimize image content and processing time depending upon the size of the source document, the informational content or "resolution" necessary for the particular application, and the particular storage medium or transmission pathway being considered.

The system is designed around a conventional bus structure, and the memory buffer may also serves as a transparent and universal junction with conventional interactive document processing systems including personal computers, networks, transmission systems, and various types of peripheral input/output devices. The system also processes electronic images in a manner that provides complete compatibility with formats and standards for digital storage, image transformation and compression, local area networks, and communications systems.

In a representative embodiment, the electronic image corresponding to a tangible source document such as an 8½"×11" page is captured using a camera producing an analog output signal with conventional raster synchronization. The vertical and horizontal synchronization pulses are stripped from the analog signal, which is then digitized in 8-bit grayscale and multiplexed to the memory buffer where the image exists as a digital array or bitmap that may be divided into a plurality of segments. The digital content is read from the memory buffer according to this dissection scheme, converted to an analog signal, and control signals are added. The control signals include horizontal and vertical synchronization pulses (and interval blanking), a pilot signal to maintain alignment along the seams between adjacent segments of the electronic image when it is reconstituted, and calibration pulses to permit instantaneous adjustment of the base grayscale level for each line of the electronic image to maintain a consistent grayscale level. The resultant analog signal is stored on a randomly accessible storage medium such as a conventional analog optical laser disk recorder (LDR) as one or more frames (each frame corresponding to a segment of the electronic image), or the resultant signal may alternately be transmitted to a remote location and reassembled, or up converted and displayed on a conventional monitor.

The primary advantages of the technology disclosed herein are therefore speed, increased qualitative integrity, enhanced image content, and universality or translatability of image content. The most compelling rationale for application of this modality in present business or commercial environments is the increased speed in document processing. There is a lesser demand to increase or enhance image content or qualitative integrity, however the inherent increase in stored image content that may be achieved without increasing storage densities or introducing undue expense or complexity to the overall system does have the effect of making this modality optimal for processing certain tangible documents as electronic images (such as written records of financial transactions, medical imaging, and damaged or unreadable originals) where preservation and reproducibility of all fundamental information in the tangible document and the corresponding certification of security and authenticity permit electronic document processing to be applied where it was previously too costly, complex, volatile, or susceptible to challenges of unfitness or impropriety.

BRIEF DESCRIPTION OF THE DRAWINGS

FIG. 3 is a diagrammatic depiction of an 8½"×11" tangible source document oriented in the upright or vertical position;

FIG. 4 is a diagrammatic depiction of the source document of FIG. 3 oriented in the sideways or horizontal position, with a phantom line showing the source document divided corresponding to two horizontally adjacent image segments, and further showing two sub-sections corresponding to the front and back of a conventional negotiable instrument (check) superimposed over the right segment of the source document;

FIG. 5 is a diagrammatic depiction of the source document of FIG. 3 oriented in the sideways or horizontal position showing the orientation of typed lines;

FIG. 6 is a diagrammatic depiction of a source document such as a C-size drawing, with phantom lines showing the source document divided into four horizontally and vertically adjacent regions corresponding approximately in size to the source document of FIG. 3;

FIG. 7 is a diagrammatic depiction of a source document (such as a seismic tracing) corresponding approximately in size to several of the source documents of FIG. 3;

FIG. 8 is a diagram showing three grayscale gradients in which 8A is a 4-bit grayscale gradient printed at 300 dpi showing 12 gray levels including black and white, 8B is 8-bit grayscale printed at 300 dpi resolution showing the dithering pattern appearing as dots of progressively increasing diameter from top to bottom, and 8C is the same 8-bit grayscale printed at 3360 dpi with a 150 line screen showing the same dithering pattern with approximately 58 gray levels appearing as horizontal banding;

FIG. 9 is a diagrammatic depiction of a single capture device utilized to capture an image associated with the source document of FIGS. 4 or 5, with a phantom line showing the source document divided corresponding to two horizontally adjacent image segments;

FIG. 10 is a diagrammatic depiction of a plurality of capture devices utilized to capture an image associated with a source document greater in size than the source document of FIG. 3, with a phantom line showing the source document divided corresponding to two adjacent image segments;

FIG. 11 is a diagrammatic depiction of a plurality of capture devices utilized to capture an image associated with both the front and back faces of a source document such as the negotiable instrument (check) shown in FIG. 4;

FIG. 12 is a diagrammatic depiction of a plurality of linear array type capture devices configured in an array utilized to capture an image associated with a source document greater in size than the source document of FIG. 3, with phantom lines showing the source document divided corresponding to an equal plurality of adjacent image segments;

FIG. 13 is a diagrammatic depiction of a line array type capture device utilized to capture an image associated with a source document, with phantom lines showing the source document divided corresponding to an image segment;

FIG. 14b shows the analog signal of FIG. 14a after digitization; FIG.

Figure 14:
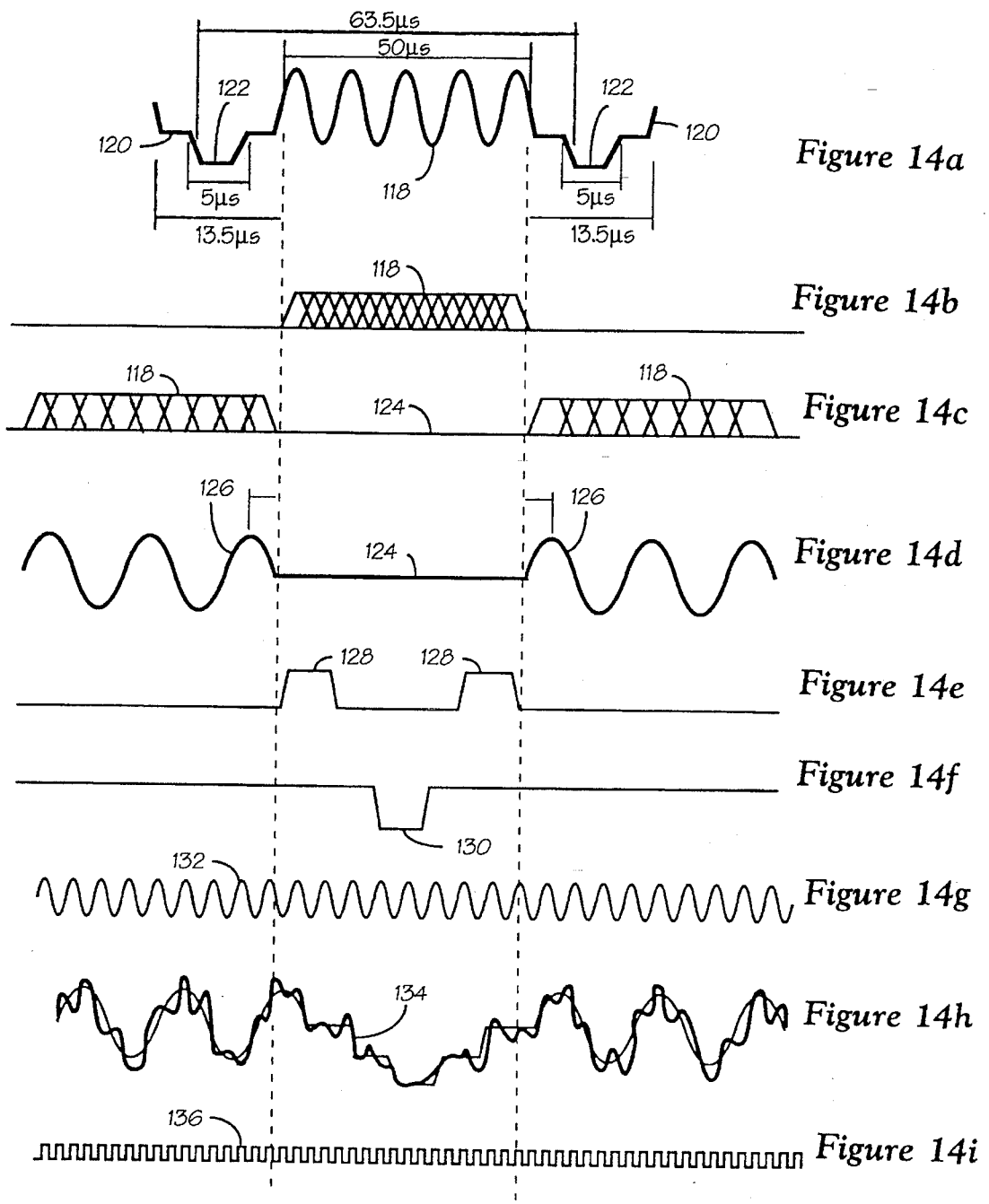
FIGS. 14(a–i) are waveform diagrams in which 14a shows synchronization pulses and blanking intervals on opposing sides of a segment of analog signal.
Figure 15:
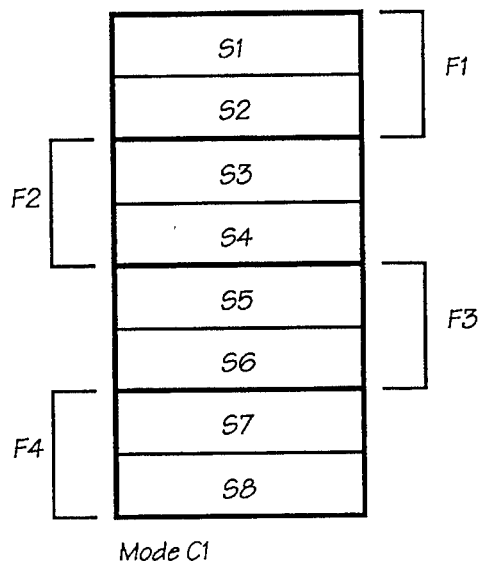
Figure 16:
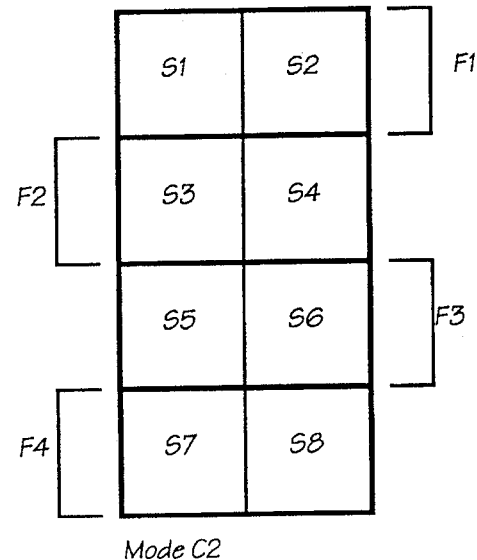
Figure 17:
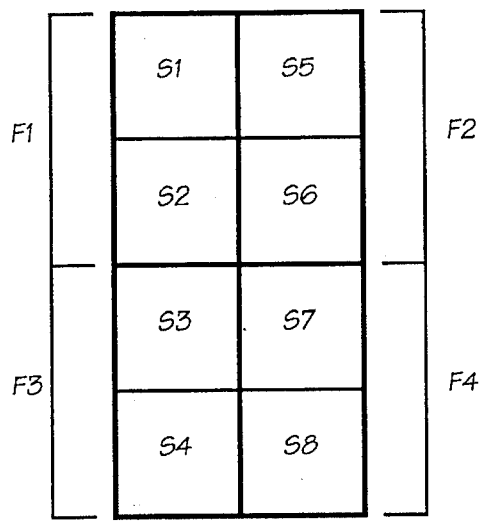
Figure 18:
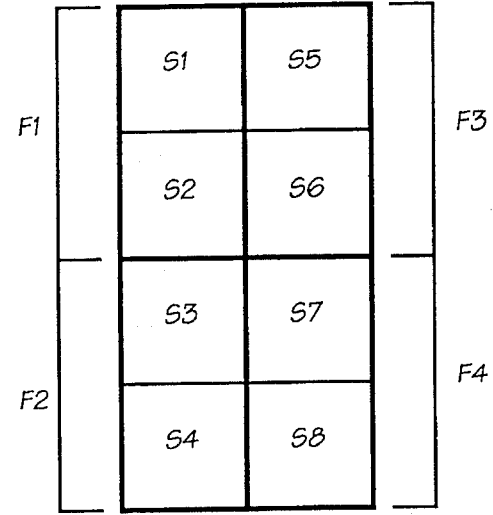

14c shows the digital signal split and expanded to form two digital segments; 14d shows the two digital segments of FIG. 14c converted to analog signals; 14e shows two positive-going calibration pulses; 14f shows a negative-going synchronization pulse; 14g shows a low level pilot signal; 14h shows a composite waveform of the two active signals of FIG. 14d summed with the signals of FIGS. 14e–14g overlaid over the sum of the signals of FIGS. 14e–14g; and 14i is a square wave corresponding to the clock speed utilized to reconstruct the electronic image represented by the analog signal of FIG. 14a;

FIG. 15 is a diagram showing the arrangement of segments and frames in Mode C1 (line delay) overlying a raster image composed of horizontal scanning lines;

FIG. 16 is a diagram showing the arrangement of segments and frames in Mode C2 (field delay) overlying a raster image composed of horizontal scanning lines;

FIG. 17 is a diagram showing the arrangement of segments and frames in Mode C3 (one frame delay) overlying a raster image composed of horizontal scanning lines; and FIG. 18 is a diagram showing the arrangement of segments and frames in Mode C4 (two frame delay) overlying a raster image composed of horizontal scanning lines.

DESCRIPTION OF THE PREFERRED EMBODIMENTS

The electronic document transmission, storage, and retrieval system of this invention is represented in FIGS. 1–14 and referenced generally therein by the numeral 10.

Figure 1:
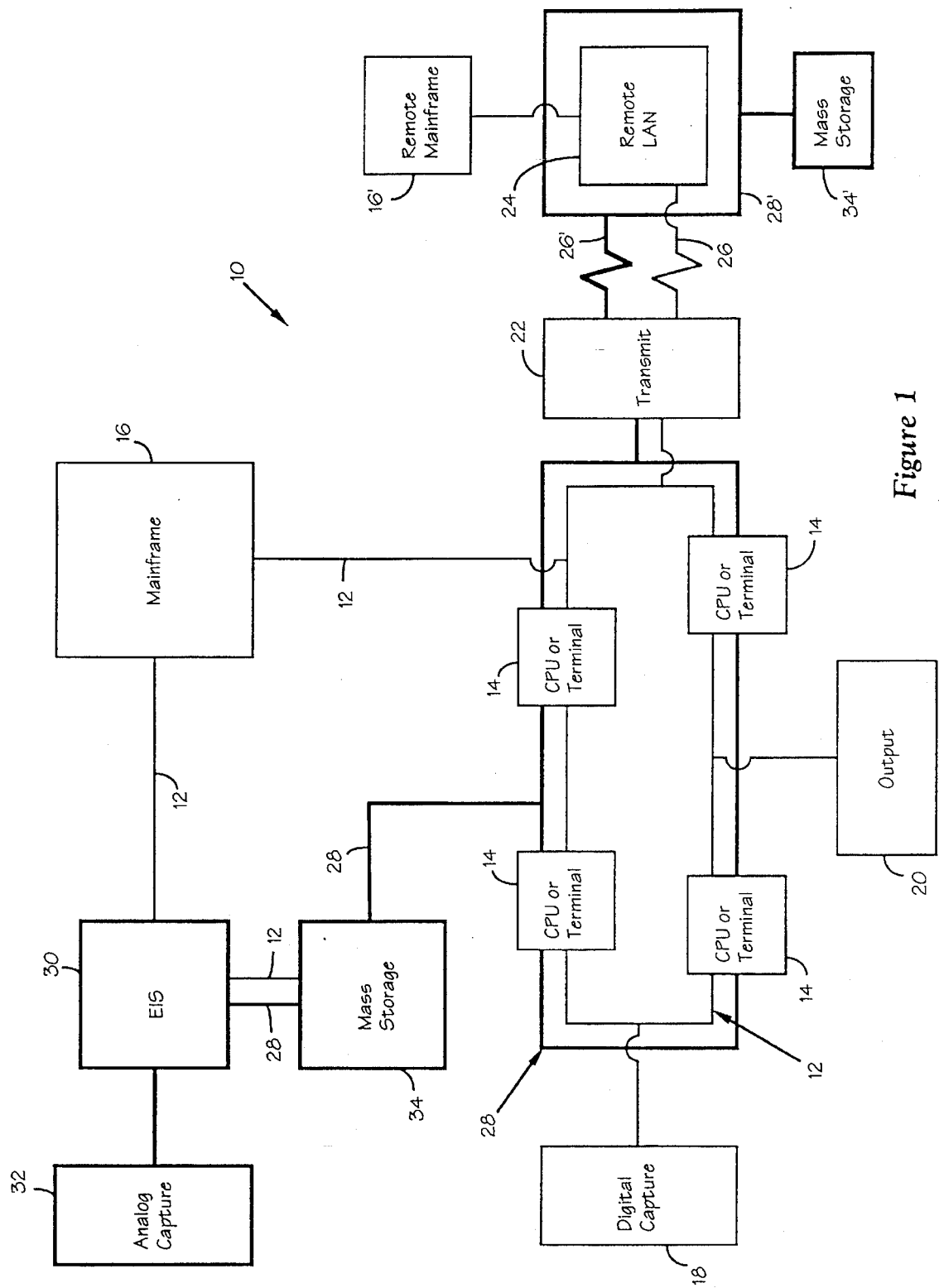
FIG. 1 is a diagrammatic depiction of an interactive document processing network utilizing the electronic document transmission, storage, and retrieval system of this invention for the capture, transmission, storage, and retrieval of electronic image documents.

Referring particularly to FIG. 1, an interactive document processing environment is shown which includes a low speed local area network (LAN) 12 such as a Novell or Ethernet network or a peer-to-peer network system linking a plurality of nodes which may be occupied by personal computers 14, terminals, or workstations. The network 12 is optionally linked to a mainframe 16 or file server along a conventional digital communications pathway. Each computer 14 on the network 12 is linked to various peripheral devices including a digital document input device 18 such as a document scanner, an output or representation device 20 such as a laser printer or film recorder, and a transmission interface 22 such as a modem or facsimile machine. Each computer 14 or terminal preferably has various input and output devices for the operator including a keyboard, mouse, trackball, or pressure sensitive tablet, storage mediums such as a magnetic or optical disk, tape cartridge, or compact disc drive, and at least one presentation system such as a raster display or LCD projection screen associated therewith-.

Each of the computers 14 in the network 12 are simultaneously connected to a separate high speed network 28 which includes an interface module (not shown) installed in or linked to each of the computers 14. The interface module will preferably have the capability for at least retrieval and transmission of documents utilizing the high speed network 28, and may optionally include storage capability. The network 12 may also be connected to a remote network 24 through a conventional transmission pathway 26 such as telephone lines or a dedicated cable system, and a "high-speed" transmission pathway 26' capable of transmitting electronic documents at rates equivalent to the faster operating speeds of the high speed network 28 of the system 10.

The high speed network 28 is linked to an electronic image server 30, which is in turn connected to a capture device 32 and a mass storage device 34. The mass storage device 34 is connected to the electronic image server 30 by both a conventional digital communication pathway and a high speed pathway. The mainframe 16 is also connected to the electronic image server 30 along a digital communications pathway.

The electronic image server 30 may be self-contained within its own housing and include the necessary ancillary components such as a power supply, operator interface, and the like, or may be fabricated on a separate interface module mounted in a host processor such as a personal computer or workstation. It is understood that each computer 14 in the network 12 that is linked to the high speed network 28 will also include a separate EIS interface 30 which has some or all of the processing capabilities of the electronic image server 30. Thus, for purposes of clarity, the term electronic image server 30 will be used to refer to the separate unit as shown in FIG. 1 that is used primarily for capture and batch processing operations, and the term EIS interface 30 will be used to refer to a computer-based interface associated with each computer 14 or workstation.

Each EIS interface 30 may include some or all of the components necessary for storage, retrieval, transmission, or presentation depending on the number and extent of document processing operations that will be performed at that station or node. As such, the EIS interface 30 is hereafter assumed to have the full functional capabilities of, and be functionally indistinguishable from, the separate electronic image server 30 unless otherwise noted, and the schematic shown in FIG. 2 will therefore delineate the relationships of both the separate electronic image server 30 and the computer-based EIS interface 30 as being mounted on a host processor such as a personal computer or workstation.

In normal operations, images from tangible source documents will be captured using the capture device 32 and stored on the mass storage device 34. A volume and frame number for each image will be written to a database in the mainframe 16 using the conventional digital communications pathway. An operator at a computer 14 on the network 12 will issue a retrieval command to the mainframe 16 for a particular document image, and the mainframe 16 will access the database to determine the correct volume and frame numbers for the image. The mainframe 16 will issue an instruction through the digital communication pathway (and electronic image server 30) to the mass storage device 34, which will retrieve the appropriate number of frames from the storage medium in the mass storage device 34 and transmit those frame over the high speed network 28 to the requesting computer 14. The EIS interface 30 within the receiving computer 14 will reconstruct the electronic image for the operator to view, and the operator may process that electronic image as desired. Alternately, an image may be retrieved from the mass storage device 34, reconstituted in the electronic image server 30, and transmitted along the digital network 12 through the mainframe 16 and to the requesting computer 14.

If the operator working at one of the computers 14 or workstations makes a transformation to the electronic image and wishes to store that derivative image or a newly created electronic image, there are two alternatives. First, the operator could issue a store command which would cause the electronic image to be transmitted over the high speed network 28 to the mass storage device 34, with a corresponding instruction being sent to the mainframe 16 over the conventional communications pathway which would update the database with any information concerning the processing history of the electronic image, and also initiate the appropriate subroutine in the mainframe 16 to instruct the mass storage device 34 to receive and store the correct number of frames, and obtain the volume and frame numbers from the mass storage device 34 to be placed in the database. Alternately, the operator could send the electronic image in digital form through the mainframe 16 to the electronic image server 30 using the conventional digital communication pathways, where the image would be converted to frames and stored on the mass storage device 34 with the database in the mainframe 16 being similarly updated.

The remote network 24 will ordinarily be associated with a separate mainframe 16' or fileserver, and a separate high speed network 28' with a separate mass storage device 34' as well as at least one separate electronic image server (not shown) and the associated peripherals and components. If an operator wishes to transmit an electronic image to the remote network 24, the electronic image 24 may be transmitted over the high speed transmission pathway 26' to a high speed network 28' linking the nodes of the remote network 24, where it may be saved on a separate mass storage device 34' and a database in the remote mainframe 16' will perform the necessary cataloging and indexing functions. As discussed in greater detail below, it may be appreciated that images may be downloaded in batches directly from one mass storage device 34 to another 34' using the associated high speed networks 28, 28' and the high speed transmission pathway 26', with the corresponding database information being transmitted from one mainframe 16 to the other mainframe 16' along the conventional digital transmission pathway 26.

The capture device 32 could be any conventional high speed image capture device, although as discussed herein the capture device 32 and electronic image server 30 are preferably designed, structured, and tuned to match the particular document processing applications for which the high speed network 28 will be utilized.

Figure 2:
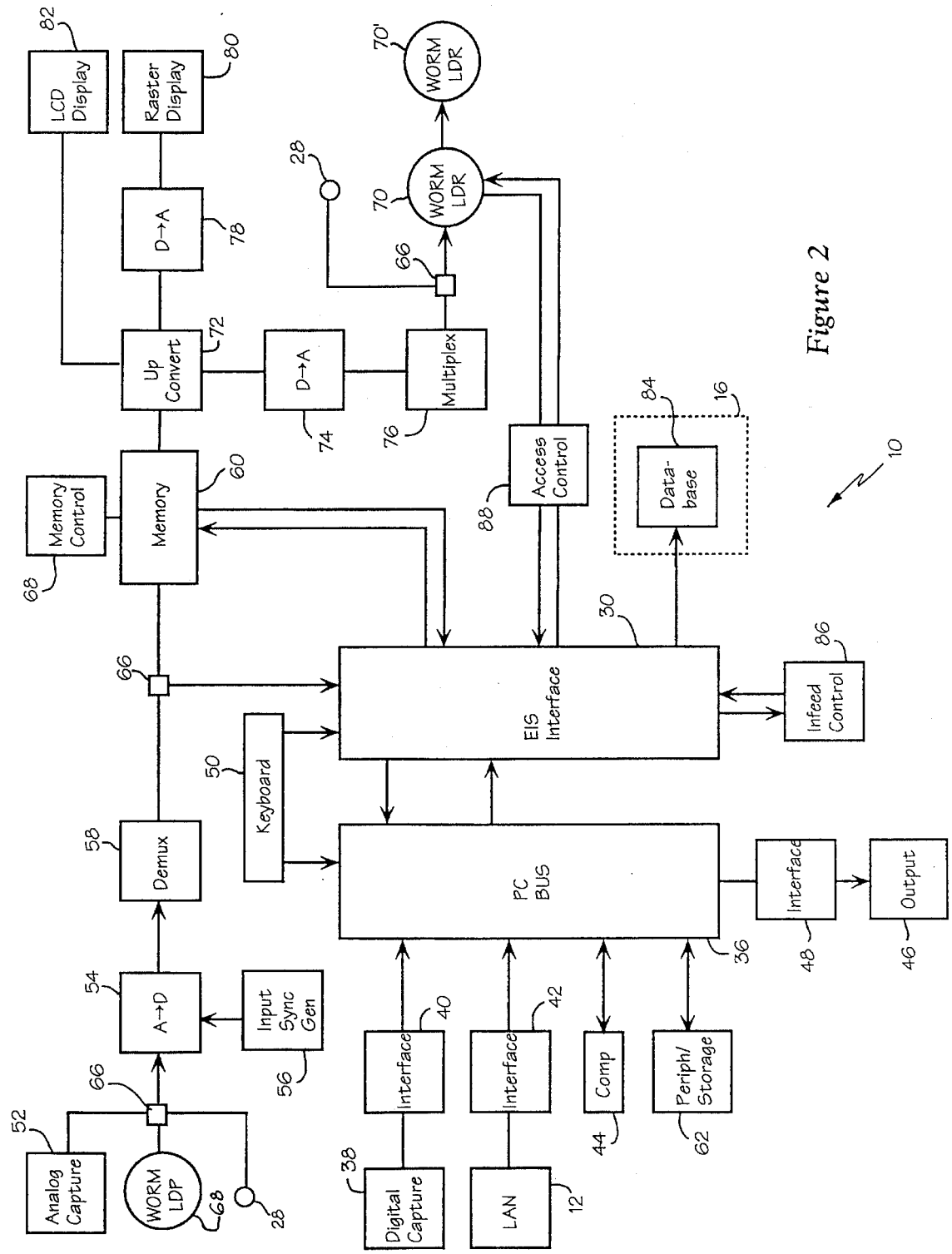
FIG. 2 is a schematic diagram showing the components of an embodiment of the electronic document transmission, storage, and retrieval system of this invention particularly adapted for the capture, transmission, storage, and retrieval of electronic image documents.

Referring particularly to FIG. 2, the various components associated with the EIS interface 30 and interconnections between the EIS interface 30 and the host processor are shown.

The host processor includes a communications pathway such as a bus structure 36 which may be of any conventional type defining or defined by the architecture of the 1 host processor. Although an external bus of the type utilized for real time data acquisition and control systems could be utilized, it has proven suitable to design the embodiments discussed herein around the main bus structure 36 of the host processor. It is understood that the bus structure 36 of most personal computers and work stations is hierarchical, including a backbone or system bus, and one or more subsystems such as an instruction exchange bus, a data exchange bus, an arbitration bus to allocate access among competing devices, and an interrupt bus to accept attention request signals from devices. The bus architecture also dictates such features as the motherboard, slot, and card dimensions, grouping and cooling of components, power distribution, and connector configurations and arrangements.

There are currently believed to be twelve accepted full standards for bus structures 36 recognized by the Institute of Electrical and Electronic Engineers (IEEE), and over fourteen proposed standards. There are also many bus standards that have been designed by special interest groups with the cooperation of other organizations to satisfy particular applications, and there are several proprietary bus standards that remain unpublicized. Adapters may also be attached to the system bus to access specialized interface buses such as the Small Computer System Interface (SCSI) for disk drives, scanners, and most other input/output devices, and the General Purpose Instrumentation Bus (GPIB) for measurement and control devices.

Some of the bus structures contemplated for use with the electronic document transmission, storage, and retrieval system 10 include PCBus (IBM PC class), ISA (IBM AT class), MicroChannel (IBM 32-bit OS/2 class), STD Bus, EISA (Compaq 32-bit), S-100 and SBus (Sun Microsystems), VME (Motorola), open Unibus and QBus (Digital/DEC), and MultiBus and MultiBus II (Intel). It may be readily appreciated that since any component connected to a personal computer bus structure 36 must operate with the host processor and all other peripheral devices, the bus structure 36 of the host processor will dictate many of the design characteristics of the EIS interface 30 and related components. The embodiments subsequently discussed are suited for applications utilizing the ISA bus on IBM compatible computer systems incorporating Intel 386 or 486 processors.

The bus structure 36 of the host processor is preferably equipped for connection to a digital capture device 38 such as a document scanner through a peripheral interface 40, a local area network 12 or peer-to-peer network through a separate network interface 42, an on board or external device capable of image compression 44 using any conventional compression standard such as JPEG, and an output device 46 such as a laser printer of film recorded connected through a serial or parallel output interface 48.

The bus structure 36 may of course be connected to many other types of peripheral devices, however these are the basic devices utilized in the capture, representation, and transmission of electronic image documents over existing networks 12 adapted for interactive document processing.

The operator will have direct command access to both the bus structure 36 and the interface for the EIS interface 30 through a keyboard 50 or other devices such as a mouse, trackball, tablet, or the like, as well as through any input/output and peripheral devices connected to the bus structure 36.

High speed document capture is accomplished using a capture device 52 which provides an analog output signal timed with synchronization and blanking pulses corresponding to individual frames following the normal fast-scan television system standards of 30 frames per second with two interlaced fields or switchable to one progressively scanned field per frame, as modified according to the provisions discussed subsequently herein. The capture device 52 may be any conventional charge-coupled device (CCD) or Vidicon tube type camera, but preferably has a progressive or sequential scan, horizontally and vertically synchronized analog output signal that is switchable between conforming to the fast-scan television system standards producing 30 frames per second and slower vertical sweep rates as required by high resolution modes of operation. An alternative would be to have two cameras to switch between. It may be appreciated that conventional CCD cameras having from less than 512×512 to greater than 2048×2048 pixel arrays will be suitable for many applications employing the modality disclosed herein, and that non-square, larger and small arrays, and linear array cameras or scanners may be equally suited for some applications.

The analog output signal from the capture device is processed through an analog-to-digital converter 54 timed using an input sync-generator 56, with the system being driven by a 124 Mhz clock speed oscillator (crystal) with input to the analog-to-digital converter 54 divided by four to achieve a 31 Mhz conversion clock speed. Since the resultant output signal is still a time-division multiplexed signal, a 31 Mhz to 3.9 Mhz demultiplexer 58 may be used to strip the timing and synchronization pulses from the output signal and distribute the remaining image signal to an input memory buffer 60 with a 3.9 Mhz clock rate that is compatible with a broader spectrum of suitable memory devices that are currently commercially available.

It may be appreciated that in the embodiments discussed an 8-bit analog-to-digital converter 54 is used to obtain digital content corresponding to an 8-bit grayscale bitmap, however the continuous analog signal output from the capture device 32 would permit any the use of an analog-to-digital converter 54 that would produce any selected bit level in either grayscale or color depending upon the particular application being considered and informational content desired.

The image input memory 60 is preferably an SRAM semiconductor memory. It should be noted for purposes of this discussion that classification of semiconductor memory usually includes dynamic and static random access memory (DRAM and SRAM), read-only memory (ROM), as well as programmable ROMs (PROM), erasable ROMs (EPROM, EEPROM), nonvolatile RAM (NVRAM), and flash-memory such as charge-coupled devices (CCD) and magnetic bubble memory. Each type of memory may be classified as dynamic or static, read/write or read-only, random or serial access, volatile or nonvolatile, and erasable using magnetic or ultraviolet radiation. Because a CCD sensor chip is properly categorized as a type of serial access semiconductor memory, it is important to distinguish between the bitmap or digital array corresponding to an electronic image formed on the CCD sensor chip of a linear imaging device (LID) such as a line-array scanner or an area imaging device (AID) camera, and the digital array or bitmap associated with the corresponding image once the digital information has been read from the capture device 32, converted and multiplexed for analog television output, interlaced if necessary for video, and subsequently digitized by a frame-grabber or similar device and deposited in active memory which may or may not be user-interactive memory. Consequently, the memory buffer 60 connotes digital semiconductor memory other than the image sensor itself which permits interactive addressing and manipulation of pixels or swapping of information into memory from which pixels may be interactively addressed and manipulate, and which may be configured as an interactive junction with a bus structure 36 or similar interfaces.

The digital array associated with a particular electronic image may be stored to or retrieved from a conventional digital storage device 62 such as a magnetic or optical disk drive, or transmitted to or through any conventional peripheral, through the bus structure 36. It should also be noted that a previously stored electronic image document may be recaptured using the analog capture pathway by substituting an alternate image input source 64 such as a write-once/read-many-times (WORM) optical laser disc player (LDP) connected through a mechanical or electronic switch 66 to the input channel of the analog-to-digital converter 54. A Sony Model LDR-5000A optical disc recorder/player (EIA Standard) has proven suitable.

The switch 66 also provides a suitable junction for linking the input of the analog-to-digital converter 54 to the high speed network 28, and it may therefore be appreciated that an electronic switching device such as a latch controllable by the EIS interface 30 or the mainframe 16 is desired for switching between the capture device 52, laser disc player 64, and high speed network 28 so that electronic images transmitted on the high speed network 28 will not be obstructed or delayed awaiting manual switching. A manual switch 66 would preferably have a default setting to the high speed network 28, with user-selected switching to the capture device 52 or laser disc player 64 intended only for intermittent operation.

At this point on the image processing pathway, the electronic image document exists as a digital array or bitmap in active memory. The digital array or bitmap may not have the same physical X-Y coordinate array as was present on a CCD sensor chip. In fact, for the applications subsequently discussed, it has proven preferable to divide or section the image into blocks or segments, and to further deposit portions of each block or segment in distinct banks of memory. However, each pixel remains mapped to a specific memory location by bank, row, column, and phase by a matrix or formula in the memory control module 68, and a set digital array or bitmap is preserved and recognized even though it may require calculation to correlate a pixel's location in memory to its position on a raster line or LCD display.

The electronic image document may then be stored on an analog storage device 70 such as an analog WORM optical laser disk recorder (LDR) by dumping the digital array from memory 60 as a conventional 4 Mhz clock speed digital transmission signal and processing that signal through the first step of a sequential frequency converter 72 (up converter) to achieve a 16 Mhz bandwidth, an 8-bit digital-to-analog converter 74, and multiplexer 76 producing a 6 Mhz bandwidth output and the appropriate timing and synchronization pulses expected by the storage device 70.

A switching device 66 may also be utilized to provide a suitable junction for linking the output of the multiplexer 76 to the high speed network 28 for transmission of electronic images, and it may be appreciated that conversion of the signal to the appropriate bandwidth for the high speed transmission pathway may require that the up converter 72 or the multiplexer 76 be instructed by the EIS interface 30 to perform the appropriate signal conversion steps to match the bandwidth of the analog signal to the corresponding transmission pathway.

The 16 Mhz clock rate signal from the first step of the frequency converter 72 may also be processed in a second step to achieve a 124 MHz clock rate signal, converted to analog using a digital-to-analog converter 78, and presented on a conventional raster display 80, preferably such as a high resolution computer monitor. In some applications subsequently discussed, separate input and output memories may be utilized, and the output memory may be read at a speed directly compatible with monitor inputs. The image may also be presented on a conventional LCD display screen 82 or projector, although the necessary signal form may need to be created as required by the LCD display 82.

Since each electronic image document is stored on the storage device 70 in the form of one or more frames (depending upon the operational mode being used and the size of the image), a database 84 is utilized to record an accession number, index, or address for the initial frame and size (or for each of the separate frames) associated with a specific document to permit cataloging and selective retrieval of any document stored on that medium. The database 84 may be located in the mainframe 16 or fileserver, a separate CPU associated with a remote EIS interface 30 device, or be resident in the computer housing the bus structure 36. In many applications involving high speed batch processing on the order of several million tangible source documents per day (such as checks or similar negotiable instruments processed by a financial institution, for example) each stored image will be identified by a volume number corresponding to the serial number of the specific disc or recording medium, and a frame number. A single frame number will be satisfactory when all batch-processed images are stored using the same quantity of frames for each image, and the combination of the volume and frame numbers may be treated together as a single index, address, or accession number. The database 84 may be an already-existing database used for processing transactions involving the source documents to which one or two fields are appended corresponding to the volume and frame numbers for the stored image, or may be a separate database 84 which provides a "look-up table" relating an identifying characteristic of the source document (such as the computer-readable MICR code on negotiable instruments or checks) with the corresponding serial and frame numbers of the stored image.

Because the speeds at which tangible documents may be captured exceeds the rate at which an operator can manually position the document, it is anticipated that automatic document feeders (not shown) will be utilized particularly with paper, film, and microfiche documents. Consequently, an infeed control interface 86 must be connected to the EIS interface 30 so that the EIS interface 30 can receive ready-state acknowledgements from the automatic document feeder and step or advance commands can be sent to the automatic document feeder, and a corresponding indexing or accession control interface 88 would be connected between the EIS interface 30 and the storage device 70 to correlate the volume serial numbers and frame numbers with the appropriate images that are stored, and provide sequencing and control signals to the storage device 70. A manual infeed control interface 86 would be used when documents are positioned manually by the operator.

A separate storage device 70' such as a second analog WORM optical laser disc recorder (LDR) may be utilized at a remote location for batch downloading or backup of images stored on the first storage device 70, with the corresponding indexing or cataloging information from the database 84 being supplied to a separate database that is connected to the second storage device 70'.

Source Document Orientation

The embodiments of the system 10 discussed herein have been specifically tailored to optimize the processes of capturing and storing electronic images from tangible source documents that are especially common to many financial and business transactions conducted in the United States, or for specialized applications that are considered document intensive. Those tangible source documents include paper documents, as well as documents previously fixed in mediums such as microfilm and microfiche. The following discussion of several paper-based source documents provides a sufficient basis for describing the particular modes of operation associated with the preferred embodiments.

Referring particularly to FIGS. 3–7, several of these source documents are shown. FIG. 3 is a diagrammatic depiction of a basic US letter-size page 90 generally approximating the horizontal and vertical dimensions or aspect ratio of a standard 8½"×11" sheet of paper (and similarly approximating an A-4 size page) in a vertical orientation. FIG. 4 is a diagrammatic depiction of the same page 90 shown in FIG. 3 in a horizontal orientation. The page 90 is divided along an imaginary vertical centerline 92 into two half-page segments 94, 96 having dimensions of approximately 8½"×5½" each. Two blocks 98 each representing the front or back face of a standard check (negotiable instrument) having dimensions of approximately 2¾"×6" are superimposed on the right half 96 of the page 90. FIG. 5 is a diagrammatic depiction of the page 90 of FIG. 3 showing the normal orientation of type written lines 100 of text on that page 90.

FIG. 6 is a diagrammatic depiction of a drawing sheet 102 having dimensions greater than twice a basic page 90, with horizontal and vertical phantom lines 104 showing the drawing sheet 102 divided into four equal quadrants or segments along both horizontal and vertical seam lines.

FIG. 7 is a diagrammatic depiction of a section of a large-scale document 106 such as a geophysical survey. The section 106 has dimensions on the order of 36"×48" and may correspond to about 4 miles of survey data with 50 samples per mile along the horizontal axis, with the entire document encompassing 70 or more miles of survey data and having a total length of many feet.

Capture Device Arrays

Referring particularly to FIGS. 9–13, it may be seen that the processes of capturing and storing electronic images from the types of source documents 90, 94, 98, 102, 106 discussed above may be accomplished in several manners depending upon the corresponding size of the source document 90, 94, 98, 102, 106 and the degree of informational content desired to be captured and stored.

FIG. 9 is a diagrammatic depiction of a single capture device 32 such as an area array CCD or Vidicon tube type camera disposed a predetermined distance or height above a source document such as a basic page 90 oriented horizontally, with a phantom line 92 identifying an imaginary centerline 92 dividing the basic page 90 into two half-page (one frame) segments A, B. FIG. 10 is a diagrammatic depiction of a pair of capture devices 32 disposed above a source document 108 such as a basic page 90 oriented vertically or two-page drawing sheet 102 oriented horizontally, with a phantom line 110 identifying an imaginary centerline or seam line dividing the source document 108 into two segments A, B (of two frames each).

FIG. 11 is a diagrammatic depiction of a pair of capture devices 32 disposed above and below a source document 112 such as a check, with one capture device 32 capturing a segment A of the resulting half-page electronic image corresponding to the front face of the check or source document 112, and the other capture device 32 capturing a segment of the resulting half-page (one frame) electronic image corresponding to the opposing face (not shown).

FIG. 12 is a diagrammatic depiction of a plurality of capture devices 32 disposed in a two dimensional (vertical and horizontal) array above a large-size source document 114, with each capture device 32 capturing a segment A-F of the resulting (multi-frame) electronic image which adjoin one another along both vertical and horizontal seam lines 116.

FIG. 13 is a diagrammatic depiction of a capture devices 32 of the line array type disposed above a large-size source document 114, with the capture device 32 sequentially capturing a segment A–C of the resulting (multi-frame) electronic image which adjoin one another along parallel seam lines 116.

"Mode A" and "Mode B" Operation

Different operational modes for the electronic document transmission, storage, and retrieval system 10 may be designed to achieve particular goals or meet certain requirements, limitations, or constraints associated with the document or the system 10. Two modes termed "Mode A" and "Mode "B" are particularly designed around document processing involving tangible source documents such as a US letter-size page 90 or smaller, 8-bit grayscale informational content, and wherein "normal" system resolution is suitable. It should be noted that "normal" resolution refers to an arbitrary resolution as defined by the particular system mode and the application of that mode to a specific operating environment. In other applications, normal resolution might refer to fractions or multiples of the "normal" resolution as defined by Modes A and B. It should also be noted that bypassing the bandwidth filters or bandwidth limiters in conventional analog WORM-type LDRs 70 to operate with the "extended" bandwidth and additional lines of image content results in an approximately 30% increase in the effective resolution or storage capacity of the storage medium, without affecting its storage density. These modifications are possible because the LDRs were designed around color broadcast specifications which differ from the optimal performance arrangement for document legibility.

Modes A and B are particularly adapted for a 1-frame 30 hz or 2-frame near 14 hz (i.e., less than 15 hz or approximately 70 millisecond) record time, capturing informational content in 8-bit grayscale from a horizontally-oriented 8½"× 11" tangible document. This orientation is believed preferable for documents containing typewritten characters, because readability of a typewritten characters requires more resolution in the "horizontal" direction than in the "vertical" direction. It may be noted that the frame rate of Mode B is deliberately not one half the frame rate of Mode A, since tube type cameras require a minimum vertical retrace time and it the necessity of achieving 1000 plus useable lines.

Mode A refers to capturing and storing one half-page image of a US letter-size source document as a single frame, whereas Mode B refers to capturing and storing the full-page image of a US letter-size source document as two frames. Although Mode A can be considered a system bypass that does not require complex seaming to retrieve and reconstitute the electronic image, the same control signals including the pilot signal and calibration pulses as discussed below are applied to documents processed in Mode A, since those control signals are also useful for maintaining electronic image integrity throughout batch-processed source documents and between different operating environments or platforms.

Normal fast-scan television provides 30 frames per second with 525 horizontal lines swept at a 60 hz vertical rate and scanned at a 15,734 hz horizontal rate with a 4:3 aspect ratio, with two interlaced scanned fields per frame. The image is sent as an amplitude-modulated (AM) signal, while audio is frequency-modulated (FM). European television (PAL standard) utilizes 625 lines, however the aspect ration remains approximately 4:3.

In Modes A and B, the capture device 52 produces a camera image of 1114 progressive (non-interlaced) lines refreshed every 70 milliseconds. When recorded using the method discussed herein on a conventional laser disc recorder 70 which expects a 525 line format, this will correspond to two images of 500 lines each with the excess lines accommodating the control signals as described. The lines of the image are therefore being scanned at 14 hz in the vertical direction (approximately one quarter the normal sweep rate) and scanned horizontally at 15 khz. A Dage-81 camera manufactured by Dage-MTI Incorporated of Michigan City, Indiana, provides a suitable capture device capable of being driven at the 14 hz vertical scan rate. It should be noted that more accumulated charge may be discharged as useable signal by lengthening the time during which a document is being scanned using a capture device in which the accumulated charge on the target is time-dependent on incident source light such as a Vidicon tube type camera. This results in enhanced image capture capabilities by effectively increasing the number of "pixels" that are contained in each scan line, although the number of scan lines that may be treated as a "frame" is reduced proportionately because each scan line is longer in duration, and the image therefore occupies more frames. Tube type cameras are therefore advantageous in applications where a CCD type camera would not provide sufficient resolution or fast enough speeds given other practical considerations, or where the fixed pixel resolutions of current CCD cameras are otherwise inadequate. While this scan rate reduction would normally produce a visible flicker if the images being captured were viewed directly from the camera output, the scan rate reduction is compensated for by subsequent frequency conversions that are interposed immediately prior to any display, projection, or other visible presentation operation. Progressive scanning is preferred since it provides a Kell factor as high as 0.9 over the traditional 0.7 value for interlaced scanning, thus producing advantages in acquisition and display, and since interlaced scanning results in greater information loss caused by inaccuracies in tracking adjacent sweeps and the time factor for decay occurring between interlaced sweeps.

The output signal from the capture device 52 is digitized at 31 Mhz and stored in a 1024×2048×8 input memory buffer 60. The memory buffer 60 is preferably two banks of eight 128 kbit SRAMS with an 8 column by 9 row architecture and a corresponding video input latch. The output signal is multiplexed into 8 segments which places 256 pixels in each row of memory. Any pixel can be identified by bank, row, column, and phase. The configuration of the memory buffer 60 in Modes A and B can be made more efficient, however this configuration permits interchangeable application to other modes and is simple to construct.

It may be appreciated from this discussion that the true potential of the 1024×2048 memory buffer 60 configuration is not necessarily being fully utilized in the embodiments which employ currently available state-of-the-art LDRs, however use of this configuration of the memory buffer 60 provides a suitable margin to permit the use of these embodiments with improved LDRs currently under development with a minimum of adaption. As noted above, there is also a rationale for having separate input (capture) and output (display or storage) memory buffers, with each separate memory buffer being optimized for its intended purpose. Since the output from the input memory to the storage device is analog and the input to the output memory is also analog for retrieval, commonality of the digital characteristics of input and output memory is unnecessary. Separate memory buffers also facilitate simplicity in designing the interface modules to have retrieve-only capabilities, thus reducing the cost and complexity per node for network systems having a centralized high speed capture and storage process.

The EIS interface 30 circuitry may be divided into three groups. The circuitry associated with the memory buffer 60 is one group. The non-124 Mhz portion can be fabricated on a first integrated circuit board using transistor-transistor logic (TTL), whereas the 124 Mhz portion (including the digital-to-analog converter 74) can be fabricated as a third group using emitter-coupled logic (ECL) on a separate integrated circuit board. The multiplexer 76 can be fabricated with the non-124 Mhz portion of the circuitry, or a remote multiplexer 76 may be connected to the non-124 Mhz portion of the circuitry using sixty-four sets of twisted-pair wires.

The resultant analog signal associated with the electronic image may be stored on the storage device 70 in video format. A 525 line 60 hz vertical scan rate WORM optical laser disc recorder (LDR) is conventional, and a Sony Model LVR-5000A (EIA Standard) laser videodisc recorder/player has proven suitable.

Storing a 1024 line image in two standard frames produces 26 excess lines, for which the LDR would "see" approximately one fourth the normal number of horizontal synchronization pulse durations during the vertical interval instead of the 21 expected, and this could affect the LDR's servo lock or otherwise result in inoperability of the LDR. There are two immediately available options for resolving this situation. First, the LDR could be adapted to expect the narrow fine vertical intervals. However, since the use of unmodified standard LDRs is desired, the preferred embodiment utilizes a standard vertical interval signal with a 1000 line video image, which necessarily results in an image that is 24 lines short of binary "pure."

It may be readily appreciated that a system utilizing a 625 line 50 hz vertical scan rate LDR compatible with the PAL (European) television and video recording standard may be preferred in situations where PAL-compatible LDRs are more readily accessible or in applications where the nature of the tangible source document makes 625 line capture the optimal alternative. In some applications, the increase in horizontal bandwidth from 4.2 Mhz to 6 Mhz may be compelling. Such a conversion will either decrease the number of images storable on a conventional optical disc by 20% (from approximately 43,000 to 36,000) or increase the recording time by about 20% per frame, In such an event, the sync generator 56 can be modified to operate corresponding to the 625 line 50 hz vertical scan PAL standard. However, it should also be remembered that the sync generator controls the drive frequency of the capture device 32 and supplies the timing waveforms for the input memory buffer 60. Consequently, selection of the appropriate capture device 32 and optimization of memory characteristics may be required.

A 525 line 60 hz vertical scan rate standard sync generator provides a composite synchronization train. After the first vertical synchronization pulse, the first 250 lines are read to the memory buffer 60. The read pauses to allow insertion of the second vertical interval, and then lines 251–500 are read. The read pauses, and the vertical interval between the first and second frames is inserted, and the second frame is read in the same manner as the first frame. The additional 50 line times are consumed by the vertical blanking intervals. At the same time the read starts for the beginning of the first frame, the LDR begins recording the output from the digital-to-analog converter 74. The image can be retrieved by reversing the storage process and reconstituting the two frames as a single electronic image document.

It may be appreciated that the tangible 8½"×11" original image is divided into four blocks or segments to be stored on two separate frames with two blocks per frame. These blocks or segments can be groups of sequentially adjacent fines, fractions or segments of adjacent lines, alternating or selected interlaced fines, or any other desired portion of the image. An electronic image having a digital array composed of X fines of pixels would result in two frames each having X/2 lines of information, and the raster corresponding to those two frames would be composed of N horizontal scanning fines at a predetermined vertical scan rate plus a maximum time interval dictated by the remaining or excess 2N-X horizontal scanning lines and the predetermined vertical scan rate which is utilized to add the raster synchronization to the analog signal for each frame.

The retrieved electronic image can be processed in two ways. It can be mapped at 3.9 Mhz onto the bus structure 36 of the host processor and swapped to the video display RAM on the computer's motherboard or on a video/graphics interface card, stored in digital form on magnetic medium, transmitted over conventional transmission pathways, or downloaded to an output device such as a printer. Alternately, for high resolution display the signal may be up converted by the frequency converter 72 to correspond to the appropriate dot clock equivalent for a high resolution gray scale or color monitor.

"Mode C" Operation

Modes A and B operation are considered biased in the horizontal direction. Mode C operation is effective where either "square" resolution or a vertical bias are desired. Mode C operation may be considered "high" resolution compared with Modes A or B, and provides twice the "normal" resolution of those modes.

The acquisition of the signal in Mode C is the same as in Modes A and B, however the image is dissected into 8 blocks and recorded as 4 frames. The resolution of the tangible source document image (using the 8½"×11" example) becomes a 1024M X-Y pixel product (1248 pixels in the 11" inch direction and 1000 pixels in the 8.5" direction) while only requiring twice the capture and storage time.

There are three alternatives for operation in Mode C. In each case the horizontal line is split in half. The read from the memory buffer 60 is performed at half the write speed (using a 7.5 khz horizontal sweep rate controlled by the read clock) to effectively expand or stretch the 12 Mhz bandwidth signal into a 6 Mhz bandwidth signal, which causes the half of the horizontal line segment to expand from 32 microseconds to 64 microseconds in duration, which appears normal to an LDR expecting a 6 Mhz analog signal with 64 microsecond line duration.

Each of the three alternatives to Mode C may be understood by considering a grid overlying a 1000 line raster image in which each line has a left and a right half.

In the first alternative (Mode C1 in FIG. 15) the grid has one vertical column of eight horizontal rows. Each row of the grid therefore corresponds to one field of a frame. Each segment is therefore one vertical row consisting of 125 left halves alternating with 125 right halves of each line. The segments are stored in ascending order, S1 through S8, so that frame F1 contains segments S1 and S2 as fields 1 and 2, frame F2 contains segments S3 and S4 as fields 1 and 2, and so forth. This mode is the least expensive since it only requires a line delay, and has the advantage of providing a security function by "scrambling" the appearance of the stored images in the event an unauthorized individual attempts to access the medium using an incompatible EIS system or view the image on an interlaced monitor.

In the second alternative (Mode C2 in FIG. 16) the grid has two vertical columns of four horizontal rows. Each segment therefore consists of either 125 left halves or 125 right halves of the lines. The segments are again stored in ascending order, S1 through S8, so that frame F1 contains segments S1 and S2 as fields 1 and 2, frame F2 contains segments S3 and S4 as fields 1 and 2, and so forth. This mode is the more expensive since it requires a field delay, and also has the advantage of providing a security function by scrambling the appearance of the stored images. The security feature of Mode C2 would produce significantly more flicker because of the difference between the horizontal sweep and vertical scan rates.

In the third and fourth alternatives (Mode C3 and Mode C4 in FIGS. 17 and 18, respectively) the grid is the same as for Mode C2, and each segment therefore consists of either 125 left halves or 125 right halves of the lines. In Mode C3 and Mode C4, however, the segments are not stored in ascending order. Instead, in Mode C3 the left halves of the lines corresponding to two segments S1 and S2 are stored as the first and second fields in frame F1, and the right halves of the lines corresponding to two segments S5 and S6 are stored as the first and second fields in frame F2. The remaining segments S3, S4, S7, S8 are similarly stored as frames F3 and F4.

In Mode C4, the left halves of the lines corresponding to two segments S1 and S2 are stored as the first and second fields in frame F1, and the left halves of the remaining lines corresponding to segments S3 and S4 are stored as the first and second fields in frame F2. The right halves of the lines corresponding to segments S5 and S6 are stored as frame F3, and the right halves of the lines corresponding to segments S7 and S8 are stored as frame F4.

Modes C3 and C4 have the advantages of allowing the direct display of a quadrant (two adjacent segments) of the image on a conventional sequential scan (non-interlaced) monitor, and in the event of discrepancies in or uncertainty about the information in the overlapping regions between quadrants, the adjacent quadrants may be viewed separately for comparison. Mode C3 presents the disadvantage of requiring a one frame delay in order to seam the quadrants properly, and Mode C4 requires a two frame delay. Mode C3 is therefore more expensive than Mode C2, and Mode C4 more expensive than Mode C3. Mode C4 may provide an advantage in simultaneously viewing two vertically adjacent quadrants which represent a strip of an electronic image or tangible document which has a extremely long length equivalent to a continuous roll of paper.

In the second alternative (Mode C2) is to place each half of the stretched line sequentially one after another. The first vertical block or field would therefore have 256 lines of active video comprising 128 first halves alternating with 128 second halves. This continues for 8 blocks or fields, at which point 4 frames have been stored. To retrieve an image stored in this mode, the added sync signals are removed and the second halves are delayed and joined to form continuous lines having a 12 Mhz bandwidth.

When an image is retrieved in Mode B, the blocks or segments corresponding to adjacent lines will seam together naturally because the separation between blocks is equivalent to a normal horizontal or vertical synchronization pulse. In the case of line segments, the top quadrants will seam together with their adjacent bottom quadrants, however a more complex seaming technique is preferably utilized between horizontally adjacent quadrants.

One technique for seaming horizontally adjacent quadrants is overscanning, in which the first halves each line segment extend 2% beyond the midpoint of the individual line segment to include a leading portion of the second half of the same line (in another segment and possibly in another frame), and the second halves begin 2% before the midpoint to include a trailing portion of the first half of the same line (also in another segment and possibly in another frame). The overlapping or redundant information may be compared in dc or ac content, time, and amplitude to match the seam, with servo loops being employed to provide the necessary degree of precision required in the manner discussed below. Higher frequency content and increasing grayscale depth will dictate the type of servo loops used.

"Mode N" Operation

Mode N refers generally to any operating mode which employs one or more capture devices 32 to capture, dissect, and seam together or reconstitute an electronic image corresponding to a source document larger than a basic US letter-size page at "normal" resolution, or to a source document of any size that is captured and stored as more than four frames and more than eight segments. It may be readily appreciated from this discussion that it various embodiments may be designed around the use of a single capture device 32 with the source document being moved or advanced to present different regions that would correspond to different segments of a larger electronic image or document, or that several capture devices 32 could be utilized as shown in FIGS. 10 or 12, either with or without movement or advancing the source document. A line-array type capture device 32 as shown in FIG. 13 may be more practical for some continuous feed applications in which the documents have a fixed width but variable length.

In some applications, such as the example provided above relating to negotiable instruments or checks, an array of two capture devices 32 such as shown in FIG. 11 are utilized to capture an images relating to the front and back faces of the source document, and those two images are subsequently placed together as a single half-page segment or frame. It may also be appreciated that several segments from several different capture devices 32 can be seamed together without regard to whether each of the segments represents a portion of a larger source document, thus allowing new documents to be created by assembling segments of other images together as though reconstituting and original electronic image.

Seaming and Image Control Signals

The raster synchronization discussed above that is added to the analog signal in order to define frames corresponding to the selected storage medium is a conventional format that may be recognized by commercial and consumer video equipment, however such a format is only a "coarse" timing reference compared to the degree of accuracy or precision necessary to dissect and reconstitute electronic image documents and still maintain the requisite level of qualitative integrity for the informational content described.

The vertical and horizontal synchronization pulses embedded in standard RS-170 formatted signal (used with standard television display and recording) are unsuitable for seaming adjacent segments of an electronic image. Four types of image control signals are therefore utilized with the embodiments of the system 10 disclosed herein.

The first two sets of signals are the horizontal and vertical raster synchronization pulses (and corresponding blanking intervals) corresponding to the camera output and frame formats discussed above. Referring to FIG. 14a, a 50 microsecond sampling of a 12 Mhz information signal 118 is shown bracketed by a pair of 13.5 microsecond blanking intervals 120 and a pair of 5 microsecond negative-going synchronization pulses 122. The line thus has a duration of approximately 63.5 microseconds. When digitized or quantitized at a 31 Mhz conversion clock rate this produces a 50 microsecond digital signal as shown in FIG. 14b, which may be segmented and stretched into two halves which are each 51.5 microseconds in length by reading from the memory buffer 60 at 15.5 Mhz, thus producing two spaced-apart signals as shown in FIG. 14c and an intervening dead zone 124. The two spaced-apart signals are converted to analog signals as shown in FIG. 14d, with a portion constituting approximately 2% of each half line situated directly adjacent to the dead zone 124 accounting for the overlap 126 created by and utilized for overscanning.

The third type of image control signal are calibration pulses 128 embedded as a part of the video signal just before and after the active video portions of the composite signal. The calibration pulses are positive-going pulses inserted immediately before and after the synchronization pulses for each line (or line segment). Each calibration pulse preferably has a width (duration) on the order of 750 nanoseconds and a height (amplitude) of 0.35 volts DC when a 0.714 volt active video signal is utilized. The calibration pulses ensure matching of the DC levels and amplitudes of adjacent segments, incremental gain calibration between adjacent fines (or line segments) of the image and against a set level for each line throughout the subject image and prior or subsequent images, and also provide an intermediate timing reference that has a resolution greater than the conventional synchronization signals but less that the pilot signal.

Gain calibration is accomplished by subtracting black from gray, with true black being clamped at zero. If a calibration pulse is read at 0.4 V, for example, a servo correction brings that line down to 0.35 V to provide an accurate gray level for each "pixel" within the line. The calibration pulse at the end of any line may be directly compared with the calibration pulse at the beginning of any adjacent line along the corresponding seam. Any divergence from the normal calibration amplitude results in shifting the level of the corresponding line so that each line exactly matches the adjacent lines and is set relative to a fixed base level, and the servo loops used for the calibration adjustments are therefore completely independent of informational content in the image.

It may be appreciated that the calibration pulses 128 provide reference to a predetermined "absolute gray" that also corresponds to a similar value for monitors and other devices, with the focus of the embodiments discussed being on a predetermined area of interest or range of grayscale levels that are commonly encountered in tangible source documents of the type used for business records, financial transactions, and so forth. The amplitude of the calibration pulses 128 may be set at any desired value to provide control over the location of the examining area within the entire grayscale range by shifting the median grayscale of the image upward or downwardly compared to an "absolute gray" value expected by the monitor or other device, while still permitting "on the fly" correction around the calibration pulses 128 for line-to-line nd segment-to-segment precision.

A conventional negative-going synchronization pulse 130 is then inserted between the calibration pulses 128, as shown in FIG. 14f.

The fourth type of image control signal is a low level (CW) pilot signal 132 or carrier tone that extends continuously throughout the stored analog signal, is synchronous with the calibration pulses 128, and is harmonically related to the clock speed. The pilot signal 132 must be high enough frequency to permit harmonization with all other synchronizing or timing signals and pulses, and therefore compatible with all divisors of the main system clock rate, and is preferably at or near one half of the write clock frequency. The pilot signal 132 should also be a frequency just above the predetermined bandwidth of the storage medium, but sufficiently distinguishable that a bandpass filter can be used to strip the pilot signal 132 without clipping active video content 118 from the signal. Since the operational spectrum for conventional laser disc medium falls off rapidly above the 6 Mhz bandwidth, a low level pilot signal 132 on the order of 6.89 Mhz has proven suitable for use with conventional LDRs, and may be filtered out prior to display of the electronic image to prevent visual disruption of the displayed image. The pilot signal 132 therefore provides many times more vernier than the standard synchronization pulses for time-based corrections in positioning and aligning adjacent segments of the image when seaming those segments together along horizontal seam lines (parallel with raster lines) or vertical seam lines (perpendicular to raster lines). The pilot signal 132 is also necessary to provide a time-based correction capability to compensate for timing errors in conventional LDRs, and the use of the recovered pilot signal 128 which is retrieved as a part of the stored signal to generate the write clock as data is written to the memory buffer 60 allows the use of this modality in connection with other storage and communications systems that produce time-based errors or which do not regulate absolute timing relative to an external reference or source.

When the pilot signal 132, calibration pulses 128, and synchronization pulses 130 of FIGS. 14e–14g are summed with the active signal portion of FIG. 14d, a composite analog waveform 134 results. As shown in FIG. 14h, that waveform generally follows and oscillates about the summed control signals 128, 130, 132.

To reconstitute the image, the composite signal 134 of FIG. 14h is retrieved from the storage medium, and a square wave from the write clock at 15.5 Mhz (derived from a recovered 6.89 Mhz pilot signal) is used to quantitize or digitize the signal and write the signal to the memory buffer 60 in the same form as shown in FIG. 14c. The "left hand" segment of the digitized signal is delayed to overlap with the "right hand" segment, and the two segments are seamed together as shown in FIG. 14b, and the digital array is converted to an analog signal with raster synchronization and blanking intervals added as shown in FIG. 14a, thus permitting the storage, transmission, or display of the electronic image. In the four versions of Mode C operation, the delay will be a line, field, or frame delay depending upon the mode.

For an 8-bit grayscale image, the processed signal does not correspond to a 1:1 quantization that would produce a true 256 level grayscale range for the electronic image. Instead, it has proven suitable in the embodiments discussed to incorporate an approximately 20% margin to provide overhead for calibration adjustments and offset. As such, the effective grayscale range would be on the order of 200 to 210 levels, which accommodates the vast majority of interactive document processing applications including high resolution medical imaging for X-rays and MRIs, and is state-of-the-art for commercially available LDRs. Applications requiting enhanced grayscale differentiation may result in sacrificing a portion of the margin, or increasing the bit depth of the system.

Transmission Pathways

The transmission of an electronic image as an analog signal provides significant improvement in transmission rates compared with even the fastest conventional digital transmission by modem or facsimile or over network lines. However, it may be appreciated that the segmenting of the electronic image in the memory buffer 60 and conversion to a resultant analog signal of appropriate bandwidth permits additional increases in transmission rates over conventional transmission pathways having limited bandwidths, as well as high speed transmission pathways having larger bandwidths.

It is important to note when considering conversion of an analog signal for transmission that the parameters for transmission over a digital transmission pathway are traditionally specified in Mhz clock speeds. According to the Nyquist theorem, a perfect system free of filtering imperfections would permit the transmission of an analog signal having a frequency (R) referred to as the Nyquist frequency at no less than twice (2R) the clock rate which is referred to as the sampling or Nyquist rate. In the preferred embodiments discussed above, the Nyquist frequency of the analog signal from the capture device 32 and from the initial digital-to-analog conversion is on the order of 12 Mhz, whereas the sampling rate uses a 31 Mhz clock rate. Consequently, this produces a Nyquist ratio of approximately 2.6 between the clock rate and analog Nyquist frequency. This conversion ratio also provides an estimate for the effective analog bandwidth that may be allotted to a specific digital pathway. As such, if one were transmitting a 12 Mhz analog signal over a 4 Mhz clock rate transmission pathway in a perfect system (where the Nyquist ratio is 2 and the maximum bandwidth is 2), it would be necessary to either slow the analog signal down by a factor of 6 times and transmit continuously, or divide the signal into six components and transmit in parallel.

Utilizing the system 10 of this invention, it is possible to accomplish either of these processes in a way that is optimal for the particular application and transmission pathway. The actual bandwidth of the analog signal may be reduced to a lower bandwidth that corresponds to a digital clock rate at or below the maximum transmission clock rate of the digital transmission pathway, and then transmitted at that speed (which would be slower than if transmitted at the original bandwidth over a line having the same effective bandwidth or clock speed.) Alternately, the electronic image may be divided into a plurality of segments each having an effective bandwidth corresponding to the maximum transmission clock rate of a particular digital pathway, and then transmitted in parallel and reconstituted. In a transmission pathway having more than one parallel lines or channels (such as a conventional ISDN transmission pathway comprising three parallel channels of which two are allocated for digital transmission), the segments of the electronic image in the memory buffer 60 can be read in parallel and transmitted simultaneously on the separate digital channels or fines. Again, the bandwidth of the analog signal for each channel is optimized according to the operating parameters of that channel. Subsequent frequency conversion of the type obtained using a line multiplexer may also be applied in applications such as fiber-optic transmission, permitting a multiplicity of segments of an electronic image to be transmitted simultaneously. The analog signal may also be divided accordingly and transmitted over an analog transmission pathway at the maximum bandwidth permitted.

In their simplest embodiments, the high speed network 28 and transmission pathway 26' are broadband cables capable of transmitting television-type signals, utilizing a conventional handshake recognition and latch to lock out non-requesting nodes from the communication procedure once a request is received by the mainframe or controller and an instruction to retrieve and transmit an image is received and completed by the electronic image server 30 and mass storage device 34. Image requests, sequencing or cataloging information, and ready-state or other control signals may be transmitted over a conventional digital network such as a Novell or Ethernet system.

Because the transmission bandwidths and number of available channels or pathways are fixed for conventional communications networks, the system 10 may be optimized to permit transmission on these existing communication lines, including satellite and microwave transmission, multichannel RF television, as well as transmission over home-broadcast cable television systems. The transmission operation is also completely compatible with and transparent to any conventional communications-related security technology, such as those employing modulated line scrambling devices and signal encryption algorithms.

It may be readily appreciated that the various embodiments and modes of operation discussed above constitute only representative examples of the optimization of the disclosed method to: (1) a specific size and type of source document; (2) a particular operating environment; (3) a predetermined level of informational content or resolution for the electronic image; and (4) the utilization of selected devices and equipment for initial image capture, CPU bus and interface, storage medium, and transmission pathways based upon existing commercial availability and cost.

It is understood that the systems for practicing the disclosed method may be optimized according to many different parameters beyond informational content and processing time, however it is expected that these two parameters will remain most significant for practical commercial applications. It is further understood that many factors will affect the design of alternate modes of operation or further embodiments of the system, such as: the selection of alternate devices or equipment; the continuing refinement and introduction of new capture, storage, and transmission technologies; the operational guidelines imposed for accomplishing specified tasks for certain applications; the nature and limitations of the operating environment; the modifications or adaptations involved in applying this method to electronic content; the transition between different television, video, and communications standards in this and other countries; as well as the peculiar emphasis that individuals or users may be placed on etherial considerations such as cost, complexity, security, or other aesthetic values affecting basic design features.

While the preferred embodiments of the above electronic document transmission, storage, and retrieval system 10 has been described in detail with reference to the attached drawing Figures, it is understood that various changes and adaptations may be made in the electronic document transmission, storage, and retrieval system 10 without departing from the spirit and scope of the appended claims.

What is claimed is:

1. A method for the storage and retrieval of a two-dimensional electronic image expressible as a digital array or bitmap for the purpose of interactive document processing, said method being utilized in association with a storage device having a storage medium, said method comprising the steps of:

writing at least a portion of the digital array or bitmap corresponding to the two-dimensional electronic image to an output memory;

reading said digital content from said output memory;

converting said digital content to a first analog signal as said digital content is read from said output memory;

adding a plurality of image control signals to said first analog signal to define a format, said format defining a frame;

selectively transmitting said first analog signal over the transmission pathway to the remote location or storing said first analog signal as at least one said frame on the storage device, the storage device being capable of receiving and storing said first analog signal on the storage medium along with a multiplicity of like frames, the storage device further being capable of randomly accessing and selectively retrieving and outputting a separate analog signal corresponding to said first analog signal stored as at least one said frame from among said multiplicity of lie frames, said separate analog signal including said plurality of image control signals;

retrieving said separate analog signal including said plurality of image control signals from the storage device;

stripping said plurality of image control signals from said separate analog signal retrieved from the storage device;

converting said separate analog signal retrieved from the storage device to a digital signal;

writing said digital signal to an input memory such that the digital array or bitmap corresponding to the two-dimensional electronic image is reconstituted in said input memory, whereby the electronic image may subsequently be utilized in one or more document processing operations including the transformation, presentation, representation, transmission, or storage and retrieval of the electronic image, wherein the plurality of image control signals includes a plurality of raster synchronization pulses and corresponding blanking intervals, at least one pilot signal, and at least one set of calibration pulses.

2. The method of claim 1 wherein the storage medium has a predetermined bandwidth and wherein the frequency of the pilot signal is at or slightly above said predetermined bandwidth of the storage medium.

3. The method of claim 2 wherein the predetermined bandwidth of the storage medium is on the order of 6 Mhz and the pilot signal is on the order of 7 Mhz.

4. The method of claim 1 wherein the pilot signal is a continuous signal which extends throughout the separate analog signal.

5. The method of claim 1 wherein the format defining the frame is a raster composed of N scanning lines at a predetermined scan rate, each of said scanning lines having an active portion corresponding to an informational content of the two-dimensional electronic image, and further wherein the at least one set of calibration pulses include a first calibration pulse inserted before the active portion of each of the scanning lines and a second calibration pulse inserted after the active portion of each of the scanning lines.

6. The method of claim 5 wherein the first calibration pulse and the second calibration pulse each have a duration and an amplitude, such that said amplitude of the first calibration pulse of a first scanning line may be compared with either said amplitude of the first calibration pulse or said amplitude of the second calibration pulse of a like scanning line or with a fixed amplitude.

7. The method of claim 6 wherein each of the scanning lines has a gain associated therewith, and wherein said gain of a selected scanning line may be adjusted in response to a comparison between the first calibration pulse of said selected scanning line and the second calibration pulse of a like scanning line or with a fixed amplitude.

8. The method of claim 6 wherein the duration of the first calibration pulse and the second calibration pulse is on the order of 750 nanoseconds.

9. The method of claim 6 wherein the amplitude of the first calibration pulse and the second calibration pulse is on the order of 0.35 volts.

10. The method of claim 1 wherein the at least one set of calibration pulses provides an intermediate timing reference that has a resolution greater than the plurality of raster synchronization pulses and corresponding blanking intervals and less than the pilot signal.

11. The method of claim 1 wherein the digital array or bitmap corresponding to the two-dimensional electronic image is composed of X lines, and wherein the format defining the frame is a raster composed of N scanning lines at a predetermined scan rate.

12. The method of claim 11 wherein the frame is composed of X/2 lines, and a time interval dictated by a quantity of 2N-X excess scanning lines and the predetermined scan rate is utilized for containing the plurality of image control signals.

13. The method of claim 12 wherein X is on the order of 1024, N is on the order of 525, and the predetermined scan rate is on the order of 60 hz.

14. The method of claim 1 wherein the method further comprises the step of:

sectioning the digital array or bitmap corresponding to the two-dimensional electronic image into a plurality of segments prior to or during the step of writing the digital content to the output memory.

15. The method of claim 14 wherein the number of the frames is one, and the number of the plurality of segments is two.

16. The method of claim 14 wherein the number of the frames is two, and the number of the plurality of segments is four.

17. The method of claim 16 wherein the digital array or bitmap corresponding to the two-dimensional electronic image is composed of X lines, and wherein each segment corresponds to a block of X/4 adjacent lines.

18. The method of claim 17 wherein the plurality of segments includes a first segment, a second segment, a third segment, and a fourth segment, said first segment being adjacent to said second segment and said third segment being adjacent to said fourth segment, and wherein the number of the frames includes a first frame and a second frame, said first segment and said second segment being stored in said first frame and said third segment and said fourth segment being stored in said second frame.

19. The method of claim 14 wherein the portion of the digital array or bitmap is written to the output memory at a write speed, and the digital content from the output memory is read at a read speed, said read speed being generally equal to one half said write speed.

20. The method of claim 19 wherein the number of the frames is four, and the number of the plurality of segments is eight.

21. The method of claim 20 wherein the digital array or bitmap corresponding to the two-dimensional electronic image is composed of X lines, and wherein each one of the plurality of segments corresponds to X/8 lines.

22. The method of claim 20 wherein the digital array or bitmap corresponding to the two-dimensional electronic image is composed of X lines, each of said lines having a first half and a second half, and wherein each one of the plurality of segments corresponds to X/8 of said first halves of said lines or X/8 of said second halves of said lines.

23. The method of claim 22 wherein the plurality of segments includes a first segment, a second segment adjacent to said first segment, a third segment adjacent to said first segment, a fourth segment adjacent to said third segment and said second segment, a fifth segment adjacent to said third segment, a sixth segment adjacent to said fifth segment and said fourth segment, a seventh segment adjacent to said fifth segment, and an eighth segment adjacent to said seventh segment and said sixth segment, each of said first segment, said third segment, said fifth segment, and said seventh segment being composed of X/8 of the first halves, each of said second segment, said fourth segment, said sixth segment, and said eighth segment being composed of X/8 of the second halves, wherein the number of the frames includes a first frame, a second frame, a third frame, and a fourth frame, said first segment and said second segment being stored in said first frame, said third segment and said fourth segment being stored in said second frame, said fifth segment and said sixth segment being stored in said third frame, and said seventh segment and said eighth segment being stored in said fourth frame.

24. The method of claim 22 wherein the plurality of segments includes a first segment, a second segment adjacent to said first segment, a third segment adjacent to said second segment, a fourth segment adjacent to said third segment, a fifth segment adjacent to said first segment, a sixth segment adjacent to said fifth segment and said second segment, a seventh segment adjacent to said sixth segment and said third segment, and an eighth segment adjacent to said seventh segment and said fourth segment, each of said first segment, said second segment, said third segment, and said fourth segment being composed of X/8 of the first halves, each of said fifth segment, said sixth segment, said seventh segment, and said eighth segment being composed of X/8 of the second halves, wherein the number of the frames includes a first frame, a second frame, a third frame, and a fourth frame, said first segment and said second segment being stored in said first frame, said third segment and said fourth segment being stored in said second frame, said fifth segment and said sixth segment being stored in said third frame, and said seventh segment and said eighth segment being stored in said fourth frame.

25. The method of claim 24 wherein the first frame and the second frame are located in sequence and adjoining one another on the storage medium.

26. The method of claim 24 wherein the first frame and the third frame are located in sequence and adjoining one another on the storage medium.

27. The method of claim 14 wherein the method further comprises the step of: seaming the plurality of segments together prior to or during the step of writing the corresponding digital content to the input memory such that the digital array or bitmap corresponding to the two-dimensional electronic image is reconstituted in the input memory.

28. The method of claim 27 wherein the digital array or bitmap corresponding to the two-dimensional electronic image is composed of a plurality of lines, an individual line of said plurality of lines including a first half and a second half, and wherein seaming the plurality of segments together comprises:

reading either the first half of said individual line plus a leading portion of said second half of said individual line or said second half of said individual line plus a trailing portion of said first half of said individual line;

comparing said leading portion of said second half of said individual line with said trailing portion of said first half of said individual line to determine an offset between said first half and said second half of said individual line; and adjusting said first half or said second half to eliminate said offset.

29. The method of claim 28 wherein the leading portion and the trailing portion of the individual line are disposed in two different ones of the plurality of segments and in one of the frames.

30. The method of claim 28 wherein the leading portion and the trailing portion of the individual line are disposed in two different ones of the plurality of segments and two different ones of the frames.

31. A method for the storage and retrieval of a two-dimensional electronic image expressible as a digital array or bitmap for the purpose of interactive document processing, said method being utilized in association with a storage device having a storage medium, said method comprising the steps of:

writing at least a portion of the digital array or bitmap corresponding to the two-dimensional electronic image to an output memory;

reading said digital content from said output memory;

converting said digital content to a first analog signal as said digital content is read from said output memory;

adding a plurality of image control signals to said first analog signal to define a format, said format defining a frame;

selectively transmitting said first analog signal over the transmission pathway to the remote location or storing said first analog signal as at least one said frame on the storage device, the storage device being capable of receiving and storing said first analog signal on the storage medium along with a multiplicity of like frames, the storage device further being capable of randomly accessing and selectively retrieving and outputting a separate analog signal corresponding to said first analog signal stored as at least one said frame from among said multiplicity of lie frames, said separate analog signal including said plurality_ of image control signals;

retrieving said separate analog signal including said plurality of image control signals from the storage device;

stripping said plurality of image control signals from said separate analog signal retrieved from the storage device;

converting said separate analog signal retrieved from the storage device to a digital signal;

writing said digital signal to an input memory such that the digital array or bitmap corresponding to the two-dimensional electronic image is reconstituted in said input memory, whereby the electronic image may subsequently be utilized in one or more document processing operations including the transformation, presentation, representation, transmission, or storage and retrieval of the electronic image, wherein the two-dimensional electronic image is captured from a tangible document and converted to the digital array or bitmap, said method further comprising the steps of:

capturing an initial image in a capture device, said initial image corresponding to a camera raster composed of X scanning lines having a predetermined scan rate, said capture device producing an analog output signal corresponding to sequentially outputting said X scanning lines at one half said predetermined scan rate, said analog output signal including a camera raster synchronization;

stripping said camera raster synchronization from said analog output signal;

converting said analog output signal to a digital input signal; and writing said digital input signal to a capture memory to form the digital array or bitmap corresponding to the two-dimensional electronic image, said digital array being composed of 2X lines.

32. The method of claim 31 wherein the analog output signal from the capture device has an initial bandwidth, and wherein the method further comprises the steps of:

converting the initial bandwidth of the analog output signal to a resultant bandwidth prior to storing or transmitting the first analog signal; and converting said resultant bandwidth to the initial bandwidth subsequent to retrieving the separate analog signal or receiving the first analog signal.

33. The method of claim 32 wherein the initial bandwidth is on the order of 12 Mhz or greater and the resultant bandwidth is on the order of 6 Mhz.

34. The method of claim 31 wherein the capture device is a camera having a normal operating scan rate for producing the camera raster composed of the X scanning lines having the predetermined scan rate, and wherein the method further comprises the step of:

driving the camera at an actual scan rate generally equal to one haft the normal operating scan rate.

35. The method of claim 31 wherein the method further comprises the step of:

multiplexing the digital input signal prior to or during the step of writing the digital input signal to the capture memory.

36. The method of claim 31 wherein the capture memory and the input memory are defined by one semiconductor memory.

37. The method of claim 31 wherein the initial image is composed of 1024 pixels in a vertical direction by 1000 pixels in a horizontal direction, and wherein the capture memory is a 1024 by 2048 bit memory.

38. The method of claim 31 wherein the capture memory is composed of two banks of eight 128 kbit memory.

39. An apparatus for the storage and retrieval of a two-dimensional electronic image existing as a digital array or bitmap in a memory for the purpose of interactive document processing by a user, said .apparatus comprising:

a computer, said computer including a communications pathway, an electronic image processing interface operatively connected to said communications pathway, and the memory, the memory being operatively connected to said communications pathway;

a storage device, said storage device being operatively connected to said electronic image processing interface and including a storage medium capable of receiving and storing an analog signal in a designated form in a predetermined format defining a frame; and said electronic image processing interface being capable of either:

selectively storing the two-dimensional electronic image to the storage device by converting the digital array or bitmap in the memory to a first analog signal as said digital content is being read from the memory, and adding a plurality of image control signals to said first analog signal in the predetermined format corresponding to at least one of the frames, or selectively retrieving the two-dimensional electronic image from the storage device by retrieving the at least one of the frames as a separate analog signal including said plurality of image control signals from said storage device, stripping said image control signals from said separate analog signal, converting said separate analog signal to a digital signal, and writing said digital signal to the memory such that the digital array or bitmap corresponding to the two-dimensional electronic image is reconstituted in the memory, said apparatus further comprising:

a transmission network said transmission network being operatively connected to the electronic image processing interface, wherein the transmission network is capable of transmitting the first analog signal including the plurality of image control signals to a remote location whereby the first analog signal may be received by a second computer having an second electronic image processing interface and a second memory, said second electronic image processing interface being at least capable of stripping said plurality of image control signals from said first analog signal, converting said first analog signal to a digital signal, writing said digital signal to said second memory associated with said second electronic image processing interface such that the digital array or bitmap corresponding to the two-dimensional electronic image is reconstituted in the second memory of the second computer.

40. The apparatus of claim 39 wherein the electronic image processing interface is capable of both selectively storing the two dimensional electronic image to the storage device and selectively retrieving the two-dimensional electronic image from the storage device.

41. The apparatus of claim 39 wherein the storage device is operatively connected to the electronic image processing interface through the communications pathway.

42. The apparatus of claim 39 wherein the electronic image processing interface is further capable of sectioning the digital array or bitmap corresponding to the two-dimensional electronic image in the memory into a plurality of segments.

43. The apparatus of claim 42 wherein the transmission network includes a plurality of transmission pathways and each one of the plurality of segments may be transmitted in parallel over said plurality of transmission pathways.

44. The apparatus of claim 42 wherein the transmission network includes at least one transmission pathway having a transmission bandwidth, and wherein the number of the plurality of segments is determined such that the first analog signal corresponding to each of said plurality of segments is within said transmission bandwidth.

45. The apparatus of claim 39 wherein the first analog signal has an initial bandwidth, and wherein the electronic image processing interface is further capable of converting said initial bandwidth to a resultant bandwidth.

46. The apparatus of claim 45 wherein the transmission network includes at least one transmission pathway having a transmission bandwidth, and wherein the resultant bandwidth is within said transmission bandwidth.

47. The apparatus of claim 39 wherein the transmission network is operatively connected to the electronic image processing interface through the communications pathway.

48. The apparatus of claim 39 wherein the designated form in which the analog signal is stored is on a digital medium such as an optical laser disc.

49. A method for the storage and retrieval of a two-dimensional electronic image expressible as a digital array or bitmap for the purpose of interactive document processing, said method being utilized in association with a storage device having a storage medium, said method comprising the steps of:

writing at least a portion of the digital array or bitmap corresponding to the two-dimensional electronic image to an output memory;

reading said digital content from said output memory;

converting said digital content to a first analog signal as said digital content is read from said output memory;

adding a plurality of image control signals to said first analog .signal to define a format, said format defining a frame;

selectively transmitting said first analog signal over the transmission pathway to the remote location or storing said first analog signal as at least one said frame on the storage device, the storage device being capable of receiving and storing said first analog signal on the storage medium along with a multiplicity of like frames, the storage device further being capable of randomly accessing and selectively retrieving and outputting a separate analog signal corresponding to said first analog signal stored as at least one said frame from among said multiplicity of lie flames, said separate analog signal including said plurality of image control signals;

retrieving said separate analog signal including said plurality of image control signals from the storage device;

stripping said plurality of image control signals from said separate analog signal retrieved from the storage device;

converting said separate analog signal retrieved from the storage device to a digital signal;

writing said digital signal to an input memory such that the digital array or bitmap corresponding to the two-dimensional electronic image is reconstituted in said input memory, whereby the electronic image may subsequently be utilized in one or more document processing operations including the transformation, presentation, representation, transmission, or storage and retrieval of the electronic image, wherein the first analog signal has an initial bandwidth, and wherein the method further comprises the steps of:

converting the initial bandwidth of the first analog signal to a resultant bandwidth prior to storing or transmitting the first analog signal; and converting said resultant bandwidth to the initial bandwidth subsequent to retrieving the separate analog signal or receiving the first analog signal.

50. The method of claim 49 wherein the initial bandwidth is on the order of 12 Mhz or greater and the resultant bandwidth is on the order of 6 Mhz or less.

51. The method of claim 1 wherein both the output memory and the input memory are defined by one semiconductor memory.

* * * * *